US012771537B2

(12) United States Patent
Hwang

(10) Patent No.: US 12,771,537 B2
(45) **Date of Patent: *Oct. 20, 2026**

(54) SYSTEM FOR CERTIFICATING AND SYNCHRONIZING VIRTUAL WORLD AND PHYSICAL WORLD

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 40 days.

This patent is subject to a terminal disclaimer.

(21) Appl. No.: 19/011,701

(22) Filed: Jan. 7, 2025

(65) Prior Publication Data

US 2025/0141679 A1 May 1, 2025

Related U.S. Application Data

(63) Continuation of application No. 18/411,565, filed on Jan. 12, 2024, now Pat. No. 12,206,779, which is a (Continued)

(30) Foreign Application Priority Data

Jun. 22, 2020 (KR) ........................ 10-2020-0075913
Jun. 22, 2020 (KR) ........................ 10-2020-0075914
Jun. 22, 2020 (KR) ........................ 10-2020-0075915
Jun. 22, 2020 (KR) ........................ 10-2020-0075916

(51) Int. Cl.
*H04L 9/08* (2006.01)
*G06F 9/38* (2018.01)

(52) U.S. Cl.
CPC ............ *H04L 9/088* (2013.01); *G06F 9/3836* (2013.01); *H04L 9/0819* (2013.01)

(58) Field of Classification Search
CPC .. G06F 9/45558; G06F 3/011; G06F 13/4022; G06F 2009/45595; G06F 9/3017; G06F 30/20; G06F 3/016; G06F 9/546; G06F 16/2379; G06F 16/9535; G06F 2009/45583; G06F 2212/657; G06F 3/0604; G06F 3/0647; G06F 3/067; H04L 9/3836; H04L 9/088; H04L 9/0819; H04L 67/12; H04L 5/0048; H04L 67/10; H04L 5/0051; H04L 5/001; H04L 65/4069; H04L 65/4076; H04L 1/1812; H04L 2209/38; H04L 27/26; H04L 63/0272; H04L 63/0823; H04L 9/3239; H04L 12/282; H04W 56/001; H04W 72/0446;
(Continued)

(56) References Cited

U.S. PATENT DOCUMENTS 10,242,501 B1 * 3/2019 Pusch ................ G02B 27/0172
11,662,215 B2 * 5/2023 Bennati .............. H04L 63/0421
701/411

(Continued)

FOREIGN PATENT DOCUMENTS

KR 10-2002-0007892 A 1/2002
KR 10-2011-0063629 A 6/2011

*Primary Examiner* — Sharif E Ullah
(74) *Attorney, Agent, or Firm* — Zachary Rimkunas

(57) ABSTRACT

A device or space existed in a physical space is registered in the form of a digital object in a virtual space, a digital twin service is provided through connection between an offline device or space and the digital object in the virtual space.

16 Claims, 20 Drawing Sheets

Related U.S. Application Data continuation of application No. 17/462,483, filed on Aug. 31, 2021, now Pat. No. 11,909,875, which is a continuation of application No. 16/951,576, filed on Nov. 18, 2020, now Pat. No. 11,153,084.

(58) Field of Classification Search

CPC ... H04W 4/12; H04W 72/04; H04W 72/0413; H04W 72/042; H04W 72/14; H04W 74/0833; H04W 76/11; H04W 24/10; H04W 36/0022; H04W 36/0083; H04W 36/04; H04W 36/06

USPC .......................................................... 713/193

See application file for complete search history.

(56) References Cited

U.S. PATENT DOCUMENTS

| | | | | |
|---|---|---|---|---|
| 2010/0221693 | A1* | 9/2010 | Gupta | G09B 5/14 709/227 |
| 2016/0263477 | A1* | 9/2016 | Ladd | A63F 13/212 |
| 2018/0227277 | A1* | 8/2018 | Fischer | H04W 12/106 |
| 2020/0402293 | A1* | 12/2020 | Yerli | G06F 9/46 |

* cited by examiner

FIG. 13

| Virtual Space (1310) | Permission for access of Agent of corresponding space | Permission for device interworking of corresponding space |
|---|---|---|
| Public Space (1311)<br>(Basically providing square and VSC) | Agent (Subject for all general agent) | VSC |
| Commercial Space (1312)<br>( Digital Object paid by specific business operator) | Agent<br>& Registered Agent | VSC & Space Owner |
| Home Space (1313)<br>(Digital object configured by individual) | Registered Agent<br>(Base on Relationship with Space Owner Agent) | VSC & Space Owner |

SYSTEM FOR CERTIFICATING AND SYNCHRONIZING VIRTUAL WORLD AND PHYSICAL WORLD

CROSS REFERENCE TO RELATED APPLICATIONS

This application is a continuation of U.S. application Ser. No. 18/411,565, filed Jan. 12, 2024, now U.S. Pat. No. 12,206,779, issuing Jan. 21, 2025, which is a continuation of U.S. application Ser. No. 17/462,483, filed Aug. 31, 2021, now U.S. Pat. No. 11,909,875, issued Feb. 20, 2024, which is a continuation of U.S. application Ser. No. 16/951,576, filed Nov. 18, 2020, now U.S. Pat. No. 11,153,084, issued Oct. 19, 2021, which claims the priority benefit of Korean Patent Application No. 10-2020-0075913, filed on Jun. 22, 2020, Korean Patent Application No. 10-2020-0075914 filed on Jun. 22, 2020, Korean Patent Application No. 10-2020-0075915 filed on Jun. 22, 2020, and Korean Patent Application No. 10-2020-0075916 filed on Jun. 22, 2020 the entire contents of each of which are incorporated herein by reference in their entirety.

BACKGROUND

1. Field of the Invention

The following example embodiments relate to a technology for certificating and synchronizing virtual world and physical world.

2. Description of Related Art

In the existing browsing environment, business operators operating medium providing services and third party business operators who are external business operators record and use information for users by using their cookie, respectively. For example, the third party business operators expose information suitable for users in real-time through medium of the operators by using Programmatic Bidding or RTB (real time bidding) and the like based on information obtained through the cookie.

However, in case of virtual space, since all experiences of users are made in a provider-centric environment of specific virtual space, there is a problem that it is hard to effectively collect and confirm user experience information from the third party business operators' point of view. Accordingly, in the existing technology, there are limitations that the third party business operators simply expose general information to unspecified multiple users regardless of the users' activities in the virtual space or provide relevant information to the users based on information except for the users' activities in the virtual space such as users' profiles.

PRIOR ART REFERENCE

Korean Patent Publication No. 10-2002-0007892

SUMMARY

Embodiments of the inventive concept may provide a method and system for certificating and synchronizing when interconnecting between virtual world and physical world.

Embodiments of the inventive concept may provide a method and system for certificating a device in space of virtual world.

Embodiments of the inventive concept may provide a method and system for certificating space to be register in DTS (Digital Twin Space).

Embodiments of the inventive concept may provide a method and system for performing user check-in in certified space.

At least one example embodiment provides a computer device configured to comprise at least one processor implemented to execute a computer-readable instruction, and by the at least one processor, manage interconnection relation between virtual space and physical space based on information of the virtual space and information of the physical space, and register a device or space existing in the physical space in a digital object form of the virtual space.

According to an aspect of at least one example embodiment, by the at least one processor, it may provide a digital twin service through a connection between an offline device or an offline store and the digital object of the virtual space.

According to another aspect of at least one example embodiment, by the at least one processor, it may synchronize user information and activity information between the virtual space and the physical space depending on whether synchronization of a user is permitted or not.

According to another aspect of at least one example embodiment, by the at least one processor, it may connect event information related to the digital object of the virtual space as the information of the virtual space.

According to another aspect of at least one example embodiment, by the at least one processor, it may connect information related to an agent of the virtual space as the information of the virtual space.

According to another aspect of at least one example embodiment, by the at least one processor, it may connect information related to currency of the virtual space as the information of the virtual space.

According to another aspect of at least one example embodiment, by the at least one processor, it may register a device recognizable in the virtual space by using a code issued through device information or precertification.

According to another aspect of at least one example embodiment, by the at least one processor, it may register space recognizable in the virtual space by using map-based data or space information.

According to another aspect of at least one example embodiment, by the at least one processor, it may register software in the digital object form of the virtual space by using a unique key value.

According to another aspect of at least one example embodiment, by the at least one processor, it may register a group consisting of a plurality of agents in the digital object form of the virtual space.

According to another aspect of at least one example embodiment, by the at least one processor, it may register a device in the form of precertification at the time of device production in case of the device providing a connection service with the virtual space.

According to another aspect of at least one example embodiment, by the at least one processor, it may perform a status check of the device based on data periodically received from the device or information collected in the virtual space.

According to another aspect of at least one example embodiment, by the at least one processor, it may manage information of the physical space bound in the virtual space, and manage user entry and visit records connected with the space.

According to another aspect of at least one example embodiment, by the at least one processor, it may provide a connection with a network service for traffic transmitted from the physical space.

According to another aspect of at least one example embodiment, by the at least one processor, it may buffer or queue data by receiving the data transmitted from the device or the space, and route the data.

According to another aspect of at least one example embodiment, by the at least one processor, it may manage local information and owner information related to the space as the information of the physical space.

According to another aspect of at least one example embodiment, by the at least one processor, it may issue and manage a key used for a connection service between the virtual space and the physical space.

According to another aspect of at least one example embodiment, by the at least one processor, it may manage permission by each individual service subject participating in the connection service between the virtual space and the physical space.

According to various example embodiments, interconnection relation between virtual world and physical world may be certificated and synchronized.

According to various example embodiments, a device may be certificated in space of virtual world for interconnection between virtual world and physical world.

According to various example embodiments, space to be registered in DTS may be certificated for interconnection between virtual world and physical world.

According to various example embodiments, user check-in may be performed in certificated space.

These and/or other aspects, features, and advantages of the present disclosure will become apparent and more readily appreciated from the following description of embodiments, taken in conjunction with the accompanying drawings of which:

FIG. 13 is a drawing for describing examples of VS (Virtual Space) according to one example embodiment;

DETAILED DESCRIPTION

Hereinafter, some example embodiments will be described in detail with reference to the accompanying drawings.

Figure 1:
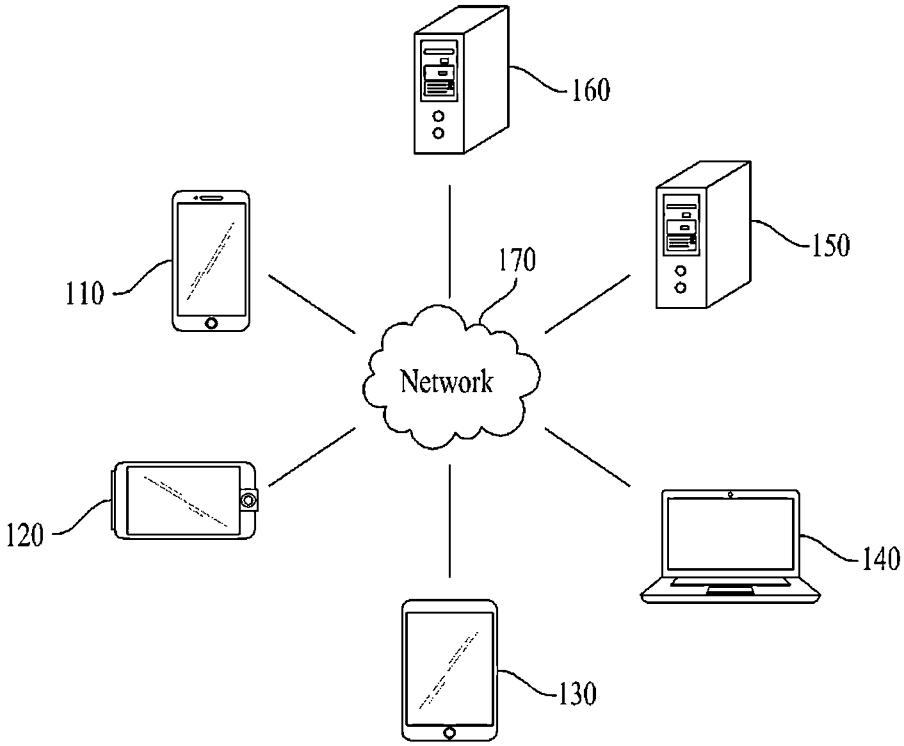
FIG. 1 is a drawing illustrating an example of a network environment according to one example embodiment.

FIG. 1 is a drawing illustrating an example of a network environment according to one example embodiment. The network environment of FIG. 1 represents an example including a plurality of electronic devices 110, 120, 130, 140, a plurality of servers 150, 160, and a network 170. FIG. 1 is an example for description of invention, and the number of electronic devices and servers is not limited as FIG. 1. Also, the network environment of FIG. 1 just describes an example of one among environments applicable to the example embodiments, and the environment applicable to the example embodiments is not limited to the network environment of FIG. 1.

The plurality of electronic devices 110, 120, 130, 140 may be fixed terminals which are implemented with a computer device or mobile terminals. As an example of the electronic devices 110, 120, 130, 140, there are a smart phone, a mobile phone, a navigation, a computer, a laptop, a digital broadcasting terminal, a PDA (Personal Digital Assistants), a PMP (Portable Multimedia Player), a tablet PC, and the like. As an example, FIG. 1 indicates a form of a smart phone as an example of the electronic device 110, but in the example embodiments, the electronic device 110 may substantially mean one of various physical computer devices which may communicate with other electronic devices 120, 130, 140 and/or the servers 150, 160 through the network 170 by using a wireless or wired communication method.

The communication method is not limited, and it may include not only a communication method using a communication network that the network 170 may include (e.g., a mobile communication network, wired Internet, wireless Internet, and a broadcasting network) but also a short-range wireless communication between devices. For example, the network 170 may include any at least one of networks of PAN (personal area network), LAN (local area network), CAN (campus area network), MAN (metropolitan area network), WAN (wide area network), BBN (broadband network), Internet, and the like. Also, the network 170 may include any one or more among network topologies including bus network, star network, ring network, mesh network, star-bus network, tree or hierarchical network, and the like, but it is not limited thereto.

Each of the servers 150, 160 may be implemented with a computer device or a plurality of computer devices providing an instruction, a code, a file, a content, a service, and the like by communicating with the plurality of electronic devices 110, 120, 130, 140 through the network 170. For example, the server 150 may be a system providing services (e.g., service based on virtual space, instant messaging service, game service, group call service (or voice conference service), messaging service, e-mail service, social network service, map service, translation service, financial service, payment service, search service, content providing service, and the like) to the plurality of electronic devices 110, 120, 130, 140 connected through the network 170.

Figure 2:
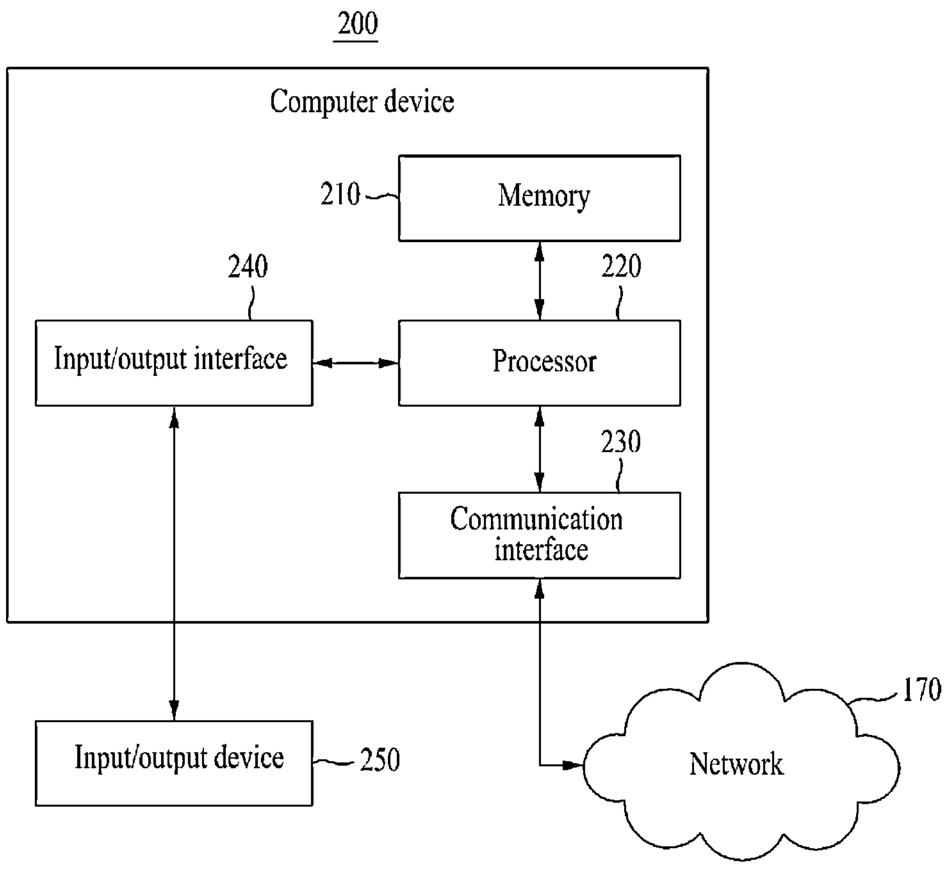
FIG. 2 is a block diagram illustrating an example of a computer device according to one example embodiment.

FIG. 2 is a block diagram illustrating an example of a computer device according to one example embodiment. Each of above described plurality of devices 110, 120, 130, 140 or each of servers 150, 160 may be implemented by a computer device 200 illustrated through FIG. 2.

Such computer device 200 may include a memory 210, a processor 220, a communication interface 230, and an input/output interface 240, as shown in FIG. 2. The memory 210 may include a permanent mass storage device such as RAM (random access memory), ROM (read only memory) and a disc drive as computer-readable recording medium. Here, the permanent mass storage device such as ROM and disk drive may be included in the computer device 200 as a separate permanent storage device distinct from the memory 210. Also, the memory 210 may store OS and at least one program code. The software components may be loaded to the memory 210 from the computer-readable recording medium separate from the memory 210. The separate computer-readable recording medium may include computer-readable recording medium such as a floppy drive, a disc, a tape, a DVD/CD-ROM drive, a memory card, and the like. In other example embodiments, the software components may be loaded to the memory 210 through the communication interface 230 in the computer, not through the computer-readable recording medium. For example, the software components may be loaded to the memory 210 of the computer device 200 based on a computer program installed by files received through the network 170.

The processor 220 may be configured to process computer program instructions by performing basic arithmetic, logic, and input/output operation. The instructions may be provided to the processor 220 by the memory 210 or the communication interface 230. For example, the processor 220 may be configured to execute the instructions received according to a program code stored in a recording device such as the memory 210.

The communication interface 230 may provide a function for communicating the computer device 200 with other devices through the network 170. For example, a request or an instruction, data, a file, and the like that the processor 220 of the computer device 200 generates according to a program code stored in a recording device such as the memory 210 may be transmitted to other devices through the network 170 according to control of the communication interface 230. Conversely, a signal or an instruction, data, a file, and the like from other devices may be received to the computer device 200 through the communication interface 230 of the computer device 200 by going through the network 170. The signal or the instruction, data, and the like received through the communication interface 230 may be transmitted to the processor 220 or the memory 210, and the file and the like may be stored in the storage medium (the above described permanent storage device) that the computer device 200 may further include.

The input/output interface 240 may be a means for interfacing with an input/output device 250. For example, an input device may include a device such as a microphone, a keyboard, or a mouse, and the like, and an output device may include a device such as a display, a speaker, and the like. As another example, the input/output interface 240 may be a means for interfacing with a device in which an input function and an output function are integrated into a single function such as a touch screen. At least one of the input/output device 250 may be configured with the computer device 200 as one device. For example, the touch screen, the microphone, the speaker, and the like may be implemented in a form included in the computer device 200 as a smartphone.

Also, in other example embodiments, the computer device 200 may include much less or much more components than the components of FIG. 2. However, there is no need to clearly illustrate most prior art components. For example, the computer device 200 may be implemented to include at least part of the described input/output device 250 or further include other components such as a transceiver, a database, and the like.

Figure 3:
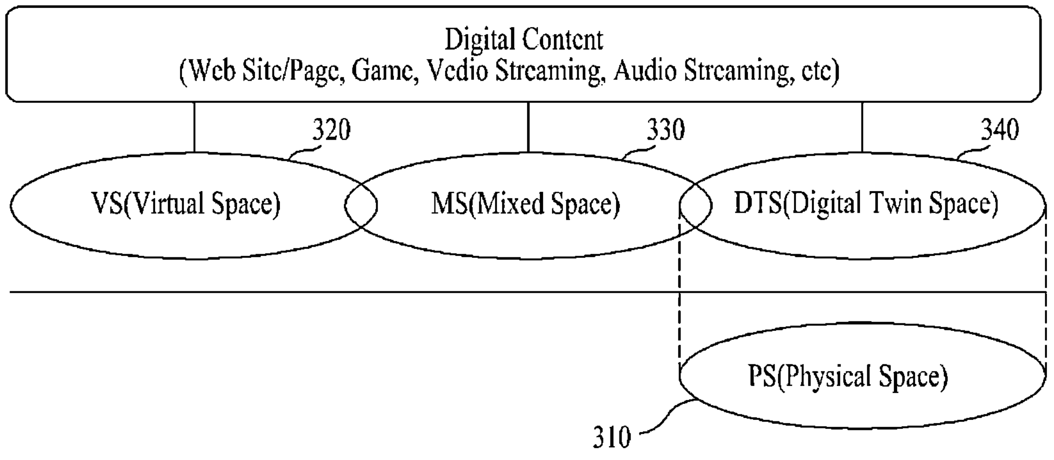
FIG. 3 is a drawing for describing spaces according to one example embodiment.

FIG. 3 is a drawing for describing spaces according to one example embodiment. FIG. 3 indicates PS (Physical Space) 310 which is space of real world and VS (Virtual Space) 320 which is space of virtual world, MS (Mixed Space) 330, and DTS (Digital Twin Space) 340.

The space of virtual world may be designed by a provider (business operator) of the corresponding virtual world, or configured by a user or a third party business operator who is an external operator. Such space of virtual world may be configured in the form of the VS 320, MS 330 and/or DTS 340 according to features of the space. The VS 320 may be pure digital based space which may be interworked with a CPS (Cyber Physical System), the DTS 340 may be space interworked with the CPS as virtual space based on real world, and the MS 330 may be space in which the VS 320 and the DTS 340 are mixed. In case of the MS 330, it may be provided in a form in which an agent which is an object of a user adapts in a real world environment, or it may be provided in a form of rendering the real world environment in the virtual world.

The space of the virtual world is a concept of basic virtual space in which the agent of the user may be active, and there may be policies for the agent's activities, information use and/or exposure for each space. The user should recognize that each of Privacy & Terms exists according to subject of service provision when using a service in space of specific virtual world.

The space of virtual world may be generated or used variously according to a provider or a user. For this, a separate gate may be provided to an interface for movement of an agent between spaces of each virtual world.

Figure 4:
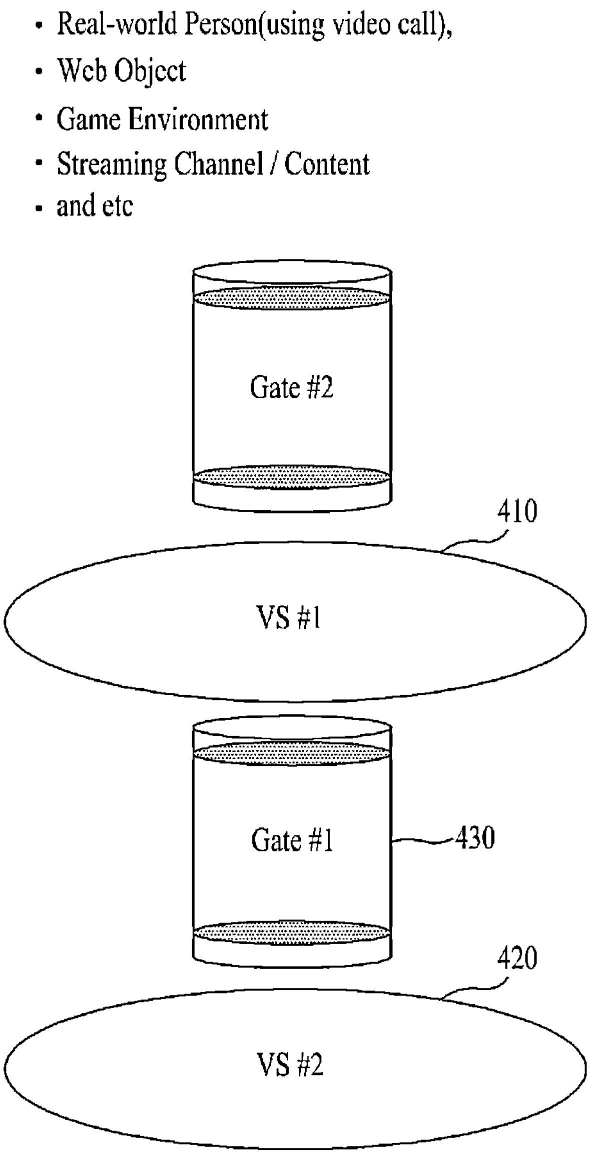
FIG. 4 is a drawing illustrating an example of movement between spaces of virtual world according to one example embodiment.

FIG. 4 is a drawing illustrating an example of movement between spaces of virtual world according to one example embodiment. FIG. 4 indicates Gate #1 430 for movement between VS #1 410 and VS #2 420 which are two virtual spaces. Here, the 'gate' may be a basic interface providing movement between spaces of virtual world. Such 'gate' may control movement between space of virtual world and space of non-virtual world as well as movement between spaces of virtual world. For example, in FIG. 4, it is indicated that an agent of the VS #1 410 may move to a movement object as space of non-virtual world such as web page, streaming channel, streaming contents, game environment, actual offline video call, and the like. The method for separating space of virtual world may be determined by a provider of space of the corresponding virtual world.

The agent may mean a user or a program in the space of virtual world. Here, the agent as the program may be a virtual avatar or persona existing instead of a third party business operator in a form of artificial intelligence agent. To such agent, physical features of the space of virtual world in which the corresponding agent is included may be applied, and service profile set in the corresponding space of virtual world may be applied. Also, the agent may have features based on information of a physical device used by a user. For example, the agent may have field of view according to features of a display of a physical device used by a user or control features according to a controller of the corresponding physical device.

In addition, a digital object to be described later may be a generic term for objects providing a mutual interaction function with the agent as a key element that composes world information in the space of virtual world.

Figure 5:
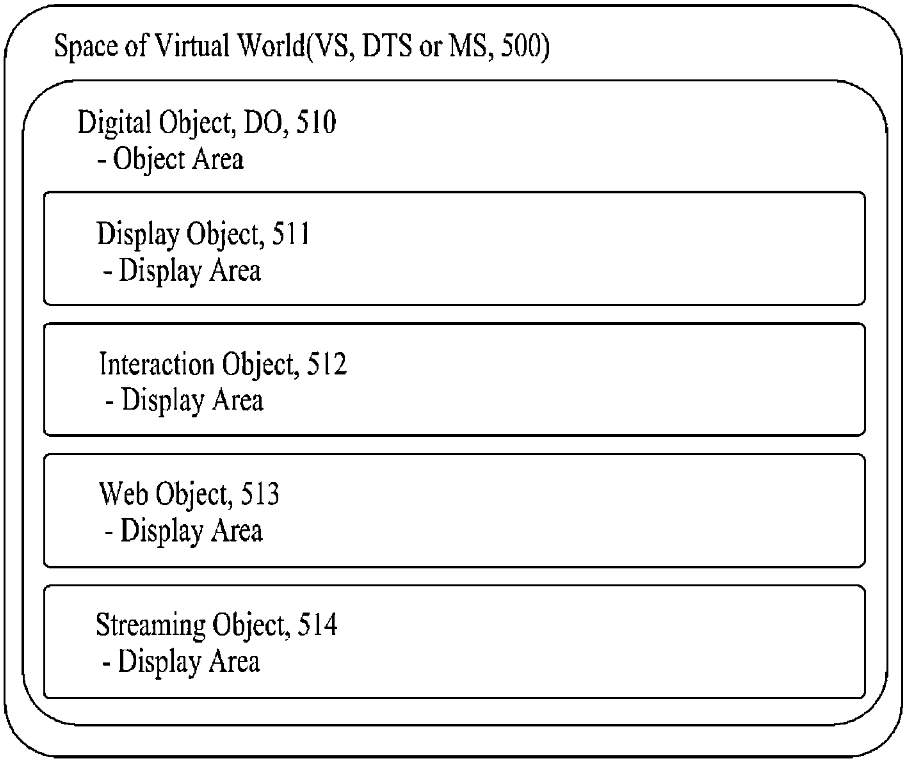
FIG. 5 is a drawing illustrating relation between components composing space of virtual world according to one example embodiment.
Figure 6:
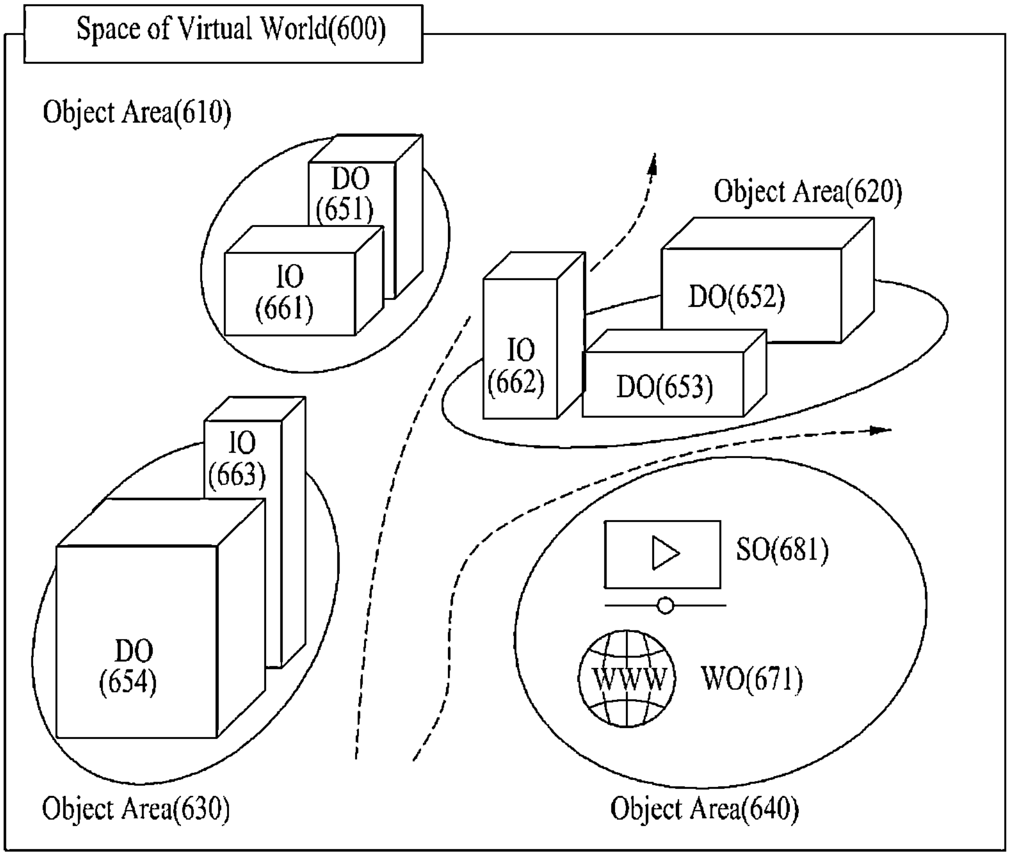
FIG. 6 is a drawing illustrating an example of a digital object configured in space of virtual world according to one example embodiment.

FIG. 5 is a drawing illustrating a relation between components composing space of virtual world according to one example embodiment, and FIG. 6 is a drawing illustrating an example of a digital object configured in space of virtual world according to one example embodiment.

FIG. 5 indicates that Space of Virtual World 500 such as the VS 320, the MS 330 and/or the DTS 340 above described through FIG. 3 may include Digital Object 510. At this time, the Digital Object 510 may be formed in OA (Object Area) which is an area that the Space of Virtual World 500 includes. Also, the Digital Object 510 may include DO (Display Object) 511, IO (Interaction Object) 512, WO (Web Object) 513 and SO (Streaming Object) 514. At this time, each of the DO 511, the IO 512, the WO 513, and the SO 514 may selectively include Display Area for display of contents.

FIG. 6 indicates an example of digital objects arranged in Object Areas 610 to 640 formed in Space of Virtual World 600. At this time, the digital objects may include DOs 651 to 654 which are display objects, IOs 661 to 663 which are interaction objects, WO 671 which is a web object and/or SO 681 which is a streaming object. Dotted arrows 691 and 692 shown in FIG. 6 indicate an example of an agent's movable movement.

As the example of FIG. 6, in the space of virtual world according to one example embodiment, various forms of digital objects may exist. Each of digital objects may be generated around the agent by determined conditions, and at this time, the digital object may be generated in the object area. When the space of virtual world imitates real world such as DTS (e.g., the DTS 340 of FIG. 3), the location of the object area may be determined based on determined physical location of the real world. For example, if a specific shopping mall or historic site and the like of the real world are virtualized, the location of the object area may be determined to have the same configuration with the actual location configuration.

The DO (Display object) may be an object exposed in a spatial form (structural form) in the space of virtual world, and may provide a simple control function to the agent. The IO (Interactive Object) may be exposed in a spatial form in the space of virtual world, and may be an object having an interactive feature which may interact with the agent. For example, the IO may provide various interaction features with the agent. Also, the WO (Web Object) may be an object in a form of exposing contents on the web through the space of virtual world. Also, the SO (Streaming Object) may be an object in a form that streaming contents such as video, audio, and the like may be continuously exposed.

The OA may have a feature of the space capable of generating a digital object which is a virtual object in the space of virtual world. The digital object existing in the OA may basically have the following features. Each function may be determined for whether it is provided or not based on a contract between an owner of the digital object and a provider of the space of virtual world.

1. Functions Related to Agent Interwork
   1) Interaction function: a function for providing an interface which may be directly controlled by an agent
   2) History function: a function for tracking and storing information related to agent's visit and interaction
   3) Favorite/Like function: a function for the agent to store favorite/like information for the digital object
   4) Follow me function: A function for making the digital object in the OA follow around the agent by making the digital object into small windows or icon.
2. Functions Related to External API Interwork
   1) A function capable of sharing information for generation time and end time of the digital object in the space of virtual world
   2) An interface function for providing information related to the agent collected by the digital objects in the OA to the outside
   3) An interface function for reflecting real world information and expressing it in the DO or the IO (e.g., a function for expressing information such as order waiting, congestion in store, parking situation, and the like of actual store)
3. A Function Related to Gate Interwork
   1) Gate connection function: a function for connecting the agent to another VS or PS in the digital object existing in the OA
4. Functions Related to DA (Display Area)
   1) DA function: an area, in which an owner of the digital object may expose contents according to the owner's intention, may be exposed to agents.
   2) Display content request function: a function for receiving external contents through Real Time Content Control Module.

Meanwhile, the DO and the IO which are parts of elements consisting of the space of virtual world may exist in the OA. The DO and the IO are basically indicated in the form of being displayed on the user's screen, and may have characteristics of a structure having a certain standard. The physical information of the DO may be provided to the provider of the space of virtual world by the owner or may be directly designed by using templates provided by the provider or using predetermined tools. Also, each of the DO and the IO may have the DA that the owner may directly control. The contents exposed in the DA may be provided according to selection of the owner of the DO and/or the IO within proper range based on policies between the owner of the DO and/or the IO and the provider of the space. The DA may individually have exposure features (features for perspective, or ignoring and emphasizing perspective, and the like) according to field of view of the agent and interaction features. In addition, each IO may have interactive features that the owner of the IO may directly control.

The IO may provide interaction suitable for the agent's situation based on the interaction feature activation information of the agent. For example, when the user wears only HMD (Head Mounted Display), the IO may provide an operation function which is the same with the DO.

On the other hand, when the user has a controller combined with the HDM, interaction features (e.g., grabbing, pulling, drawing, and the like) with the agent provided in the space of the corresponding virtual space may be provided. As another example, when the user has an additional motion recognition controller and the like, the corresponding features may be used.

In case of the DO, it may have basic control features. Such basic control features may include a basic control function of the space of virtual world set by the provider. For example, the basic control function may include history set and/or favorite/like information set and the like.

Figure 7:
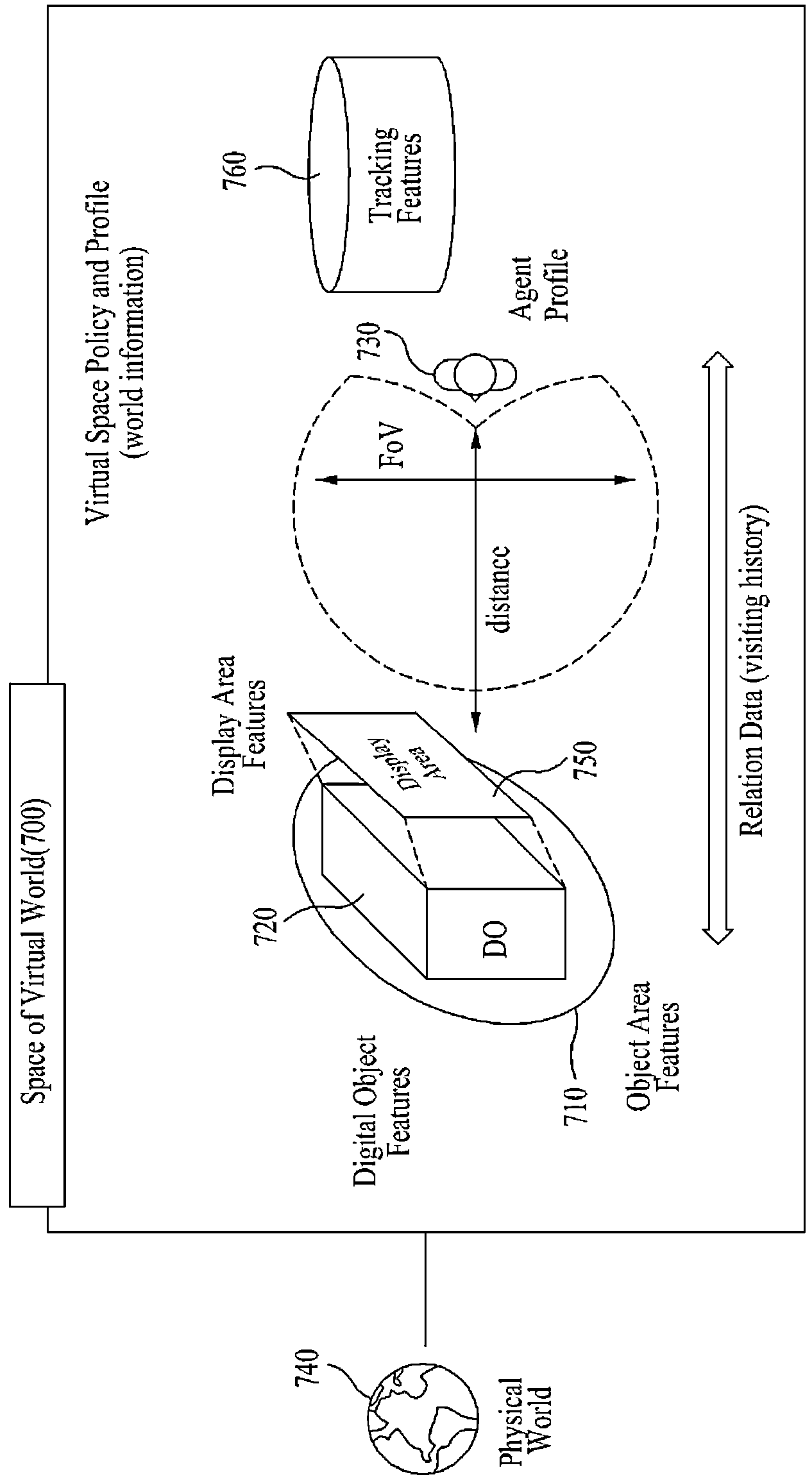
FIG. 7 is a drawing illustrating an example of information for determining whether to expose digital objects to an agent in space of virtual world according to one example embodiment.

FIG. 7 is a drawing illustrating an example of information for determining whether to expose digital objects to an agent in space of virtual world according to one example embodiment. FIG. 7 shows Object Area 710, Digital Object 720, and Agent 730 arranged in Space of Virtual World 700. The Space of Virtual World 700 may be interworked with Physical World (real world) 740. Here, features of the Digital Object 720 (Digital Object Features) may include features of the Object Area 710 (Object Area Features). The features of the Object Area 710 may include basic information for a specific area in the Space of Virtual World 700. For example, multiple sub-digital objects may exist in the Space of Virtual World 700, and each sub-digital object may follow the existing policies of the corresponding object area. Also, as already described, the Digital Object 720 may be one of DO, IO, WO, and SO. Therefore, the features of the Digital Object 720 may include one of DO's features, IO's features, WO's features, and SO's features. In addition, the features of the Digital Object 720 may further include features of Display Area 750 (Display Area Features) that the Digital Object 720 includes and Tracking Features 760 for the Agent 730.

At this time, to determine whether the Digital Object 720 is exposed to the Agent 730 in the Space of Virtual World 700, (1) features of the Digital Object 720, (2) FoV (Field of View) of the Digital Object 730, and (3) distance between the Agent 730 and the Display Area 750 may be used.

Figure 8:
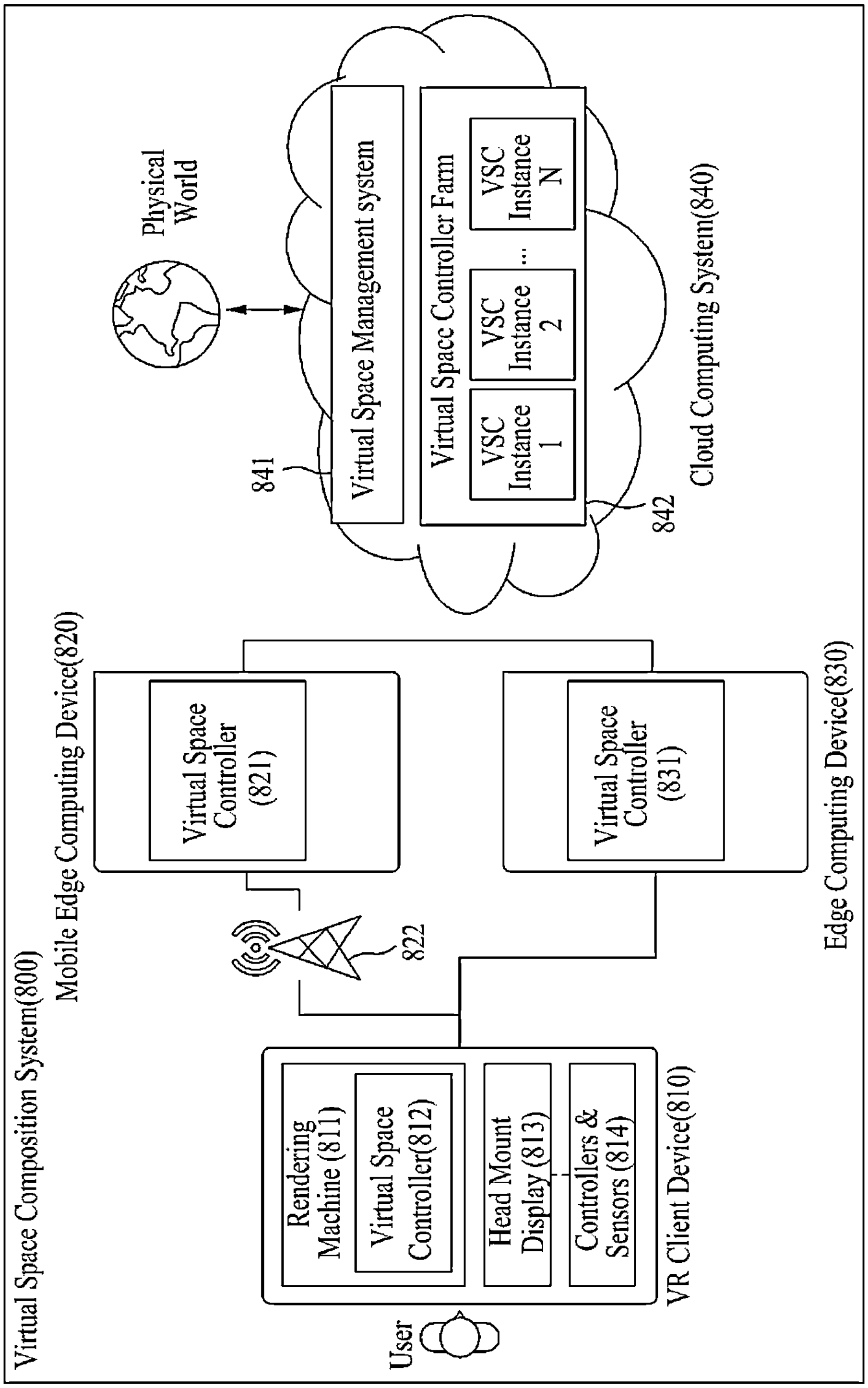
FIG. 8 is a drawing illustrating overview of a virtual space composition system according to one example embodiment.

FIG. 8 is a drawing illustrating overview of a virtual space composition system according to one example embodiment. A Virtual Space Composition System 800 of FIG. 8 may include a VR (Virtual Reality) Client Device 810, a Mobile Edge Computing Device 820, an Edge Computing Device 830, and a Cloud Computing System 840. Each of the VR Client Device 810, the Mobile Edge Computing device 820, the Edge Computing Device 830, and the Cloud Computing System 840 may be implemented through the computer device 200 described above through FIG. 2. It may be easily understood that the Cloud Computing System 840 may be implemented by two or more computer devices 200.

The VR Client Device 810 may be a physical device for displaying the space of virtual world to a user, and as shown in FIG. 8, it may include a Rendering Machine 811, a VSC (Virtual Space Controller) 812 that the Rendering Machine 811 may include, a HMD (Head Mount Display) 813, and Controllers & Sensors 814. The Rendering Machine 811 may display the space of virtual world in the HMD 813 through the VSC 812, and output value of the Controllers & Sensors 814 may be used to control the user's agent in the space of virtual world and/or interact with a digital object located in the space of virtual world.

According to example embodiments, the VSC 812 may not be directly included by the VR Client Device 810 or the Rendering Machine 811, and may be included in the Mobile Edge Computing Device 820 or the Edge Computing Device 830. For example, when the user's VR Client Device 810 is a device capable of directly rendering the space of virtual world, the space of virtual world may be rendered by using the VSC 812 of the VR Client Device 810.

On the other hand, when the user's VR Client Device 810 may not directly render the space of virtual world, the VR Client Device 810 may render the space of virtual world through a VSC 821 of the Mobile Edge Computing Device 820 wirelessly connected through an Access Point 822 or a VSC 831 of the Edge Computing Device 830 wired-connected and display it in the HDM 813. When the Mobile Edge Computing Device 820 and the Edge Computing Device 830 are not supported, as described later, the space of virtual world may be rendered by using a Virtual Space Controller farm 842 included by the Cloud Computing System 840. The Virtual Space Controller farm 842 may generate instance of VSC for the user and support the user to display the rendered space of virtual world in the HMD 813. Here, the VSCs 812, 821, and 831 may be VSC instances generated and provided by the Cloud Computing System 840 through the Virtual Space Controller farm 842.

The VSCs 812, 821, and 831 may render the space of virtual world so that contents transmitted in relation to the display area of the digital object may be displayed in the space of virtual world for the agent. The VSCs 812, 821, and 831 may be generated for the user's VR Client Device 810 corresponding to the agent by the Cloud Computing System 840 configuring the space of virtual world and providing the service, and launched on at least one of the VR Client Device 810, the Mobile Edge Computing Device 820, the Edge Computing Device 830 or the Cloud Computing System 840, and may support rendering of the space of virtual world for the VR Client Device 810.

Meanwhile, the VR Client Device 810 may receive a service related to the space of virtual world by being directly connected to the Cloud Computing System 840 or connected to the Cloud Computing System 840 through the Mobile Edge Computing Device 820 or the Edge Computing Device 830.

Such Cloud Computing System 840 may be an operator's system for configuring the space of virtual world and providing a service related to the space of virtual world to the user.

Such Cloud Computing System 840 may include a Virtual Space Management System 841 and the Virtual Space Controller farm 842 as shown in FIG. 8. The Virtual Space Controller farm 842 may be implemented in a form of being included in the Virtual Space Management System 841. The Virtual Space Management System 841 will be described in detail later through FIG. 9.

Figure 9:
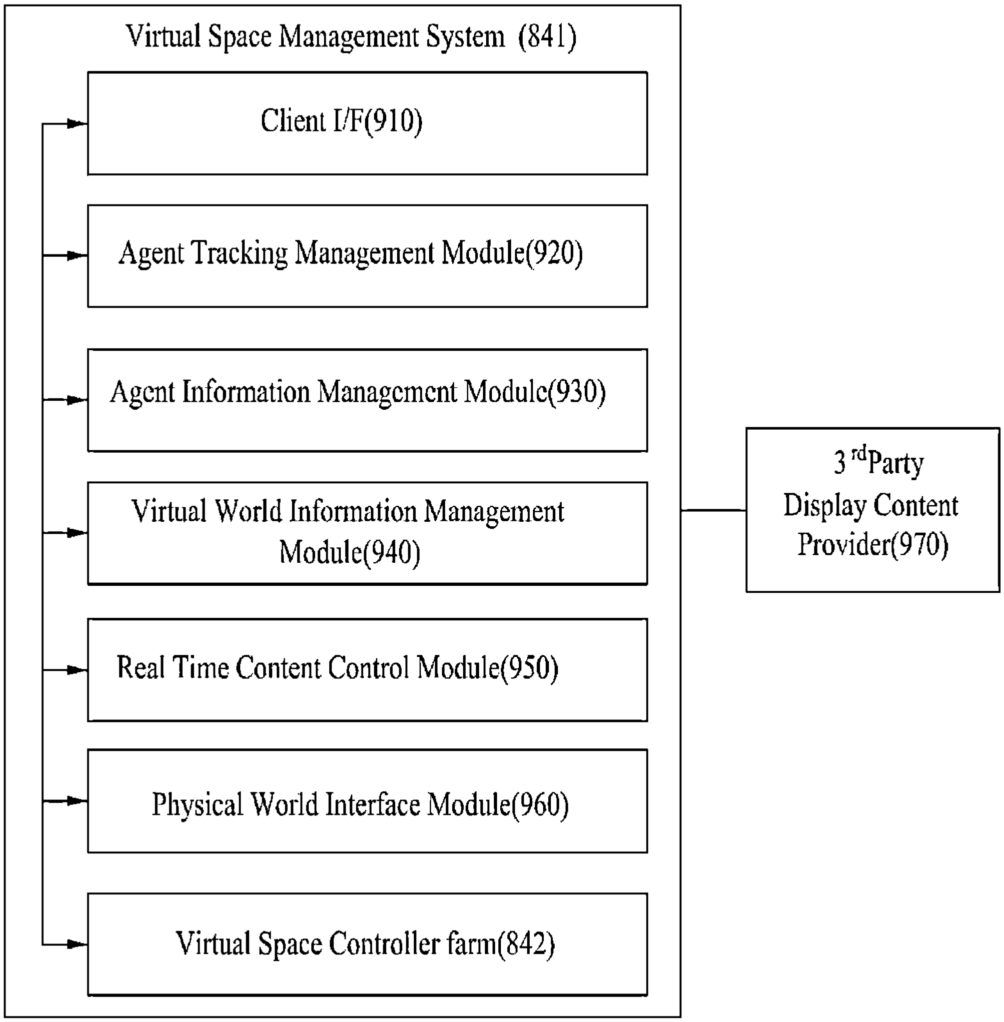
FIG. 9 is a block diagram illustrating an example of internal configuration of a virtual space management system according to one example embodiment.

FIG. 9 is a block diagram illustrating an example of internal configuration of a virtual space management system according to one example embodiment. The Virtual Space Management System 841 according to example embodiments may include a Client IF 910, an Agent Tracking Management Module 920, an Agent Information Management Module 930, a Virtual World Information Management Module 940, a Real Time content Control Module 950, a Physical World Interface Module 960, and the Virtual Space Controller farm 842 as shown in FIG. 9. Such components of the Virtual Space Management System 841 may be functional expressions of the processor 220 included by the at least one computer device 200 implementing the Cloud Computing System 840.

The Client I/F 910 may provide a user interface for the VR Client Device 810. For example, the Client I/F 910 may provide various user interfaces that the user may interact with the space of virtual world in a process that the user receive a service for the space of virtual world provided by the Cloud Computing System 840 by using the VR Client Device 810.

The Agent Tracking Management Module 920 may track an agent located and moving in the space of virtual world. The information obtained by tracking the agent may be stored in real time in relation to an identifier of the corresponding agent in Tracking DB, and the tracking history information for the agent may be stored in relation to the identifier of the corresponding agent in Tracking History DB.

The Agent Information Management Module 930 may store the agent's profile and the agent's consent. For example, the Agent Information Management Module 930 may store the agent's profile in relation to the identifier of the corresponding agent in Agent Profile DB, and may store the agent's consent in relation to the identifier of the corresponding agent in Agent Consent DB. Here, the consent may include consent for Privacy & Terms.

The Virtual World Information Management Module 940 may manage information for the space of virtual world. For example, the Virtual World Information Management Module 940 may store information for policies of the space of virtual world, Virtual Map Information, location information of the space of virtual world (e.g., GPS information for the space of virtual world), information of the digital object located in the space of virtual world, and may provide corresponding information according to request from other modules.

The Real Time Content Control Module 950 may select content displayed in the space of virtual world. For example, the Real Time Content Control Module 950 may select content to be displayed through display area of the digital object configured in the space of virtual world. For this, the Real Time Content Control Module 950 may include a function for content bidding and a function for selecting content to be displayed. For example, the Real Time Content control Module 950 may select content to be displayed through display area based on bidding for a Third Party Display Content Provider 970.

The Physical World Interface Module 960 may provide a function for controlling physical resource and an interface for physical resource.

The Virtual Space Controller farm 842 may generate, provide, and manage instance of the VSC to help the rendering of the VR Client Device 810 as described above.

Such Virtual Space Management System 841 may receive HMD information and control/sensor information from the VR Client Device 810. The HMD information may include 3-DoF (Degree of Freedom) or 6-DoF's device motion tracking information. Here, the device motion tracking information may include motion tracking information for the VR Client Device 810. Also, the HMD information may include user information from the VR Client Device 810. For example, the user information may include rotation of the user's head, movement of the user's body, and eye-gaze information of the user. Also, the HMD information may include information relating to rendering such as rendering delay, temperature, and the like. Meanwhile, the control/sensor information may include information for movement of the user's body or real time controller information such as key events, movement and the like.

Hereinafter, specific embodiments of a method and system for providing a service through connection between a user, a device, and a space in VR space will be described.

In order to provide a service based on a connection function between virtual world and real world, trust between the digital object and the agent is required.

(1) Example 1: An Agent Service May be Differentiated Through Connection Between an Offline Store and a Digital Object When the digital object proceeds with an event targeted at the agent, a differentiated service is provided in the VS if a user has a history of visiting an offline store and purchasing in a situation that a real world store is in the form of digital object in the VSCs 812, 821, 831.

When the digital object tries to proceed with a personalized service, event, and the like by using the agent information as an individual service subject, a method for providing data based on trust between the digital object and the agent is required.

Also, from the point of view of the digital object, a means for confirming whether the collecting agent's profile is reliable should be provided.

Figure 10:
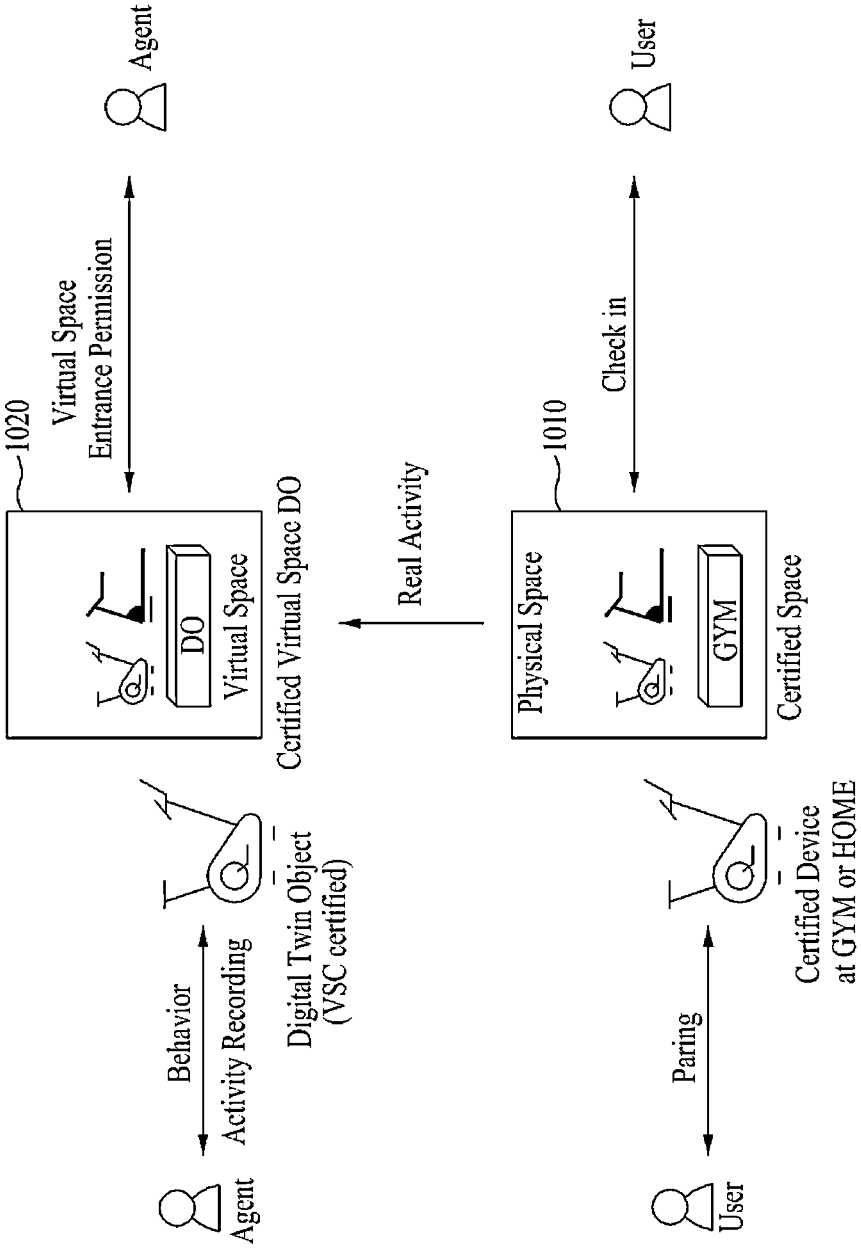
FIGS. 10 and 11 illustrate an example of connecting PS (Physical Space) and VS (Virtual Space) according to one example embodiment.

(2) Example 2: An Interconnection Service Between an Offline Device and a Virtual Device in VS May be Provided FIG. 10 shows an example of connecting PS 1010 corresponding to an offline fitness center and a device in the PS 1010 with VS 1020 and a digital object in the VS 1020.

As a user visits the fitness center in the PS 1010 which is the real world and exercises on a device certificated in the form of Digital Twin, the agent of the VS 1020 also visits the fitness center in the VS 1020 and exercises, and so changes in the agent's shape may occur and rewards may be made accordingly.

When the user exercises in real offline, if the PS 1010 fitness center provides a digital twin function with the VS 1020, and if the agent of the user wants to show simultaneity in cyber space, the corresponding agent may imitate the exercising through the corresponding device in the VS 1020.

Or, in the fitness center side, in order to show how active offline subscribers in the VS 1020 are, a random agent provided by a service provider, not the agent of the actual user, may shows the exercising. A general agent visiting the fitness in the VS 1020 may determine the degree of the activation of the corresponding offline environment by confirming virtual information currently used by the digital twin-based agent of the registered user. Through this, unsubscribed agent visiting the fitness center in the VS 1020 may determine whether to subscribe in the real world by checking the activated level of the corresponding fitness.

In addition, exercise history may be reflected in real time or may be reflected by the user's decision in the VS 1020 according to the user's selection. In this process, the fitness center operator may select real time or non real time interwork according to the digital twin's subscription model.

Figure 11:
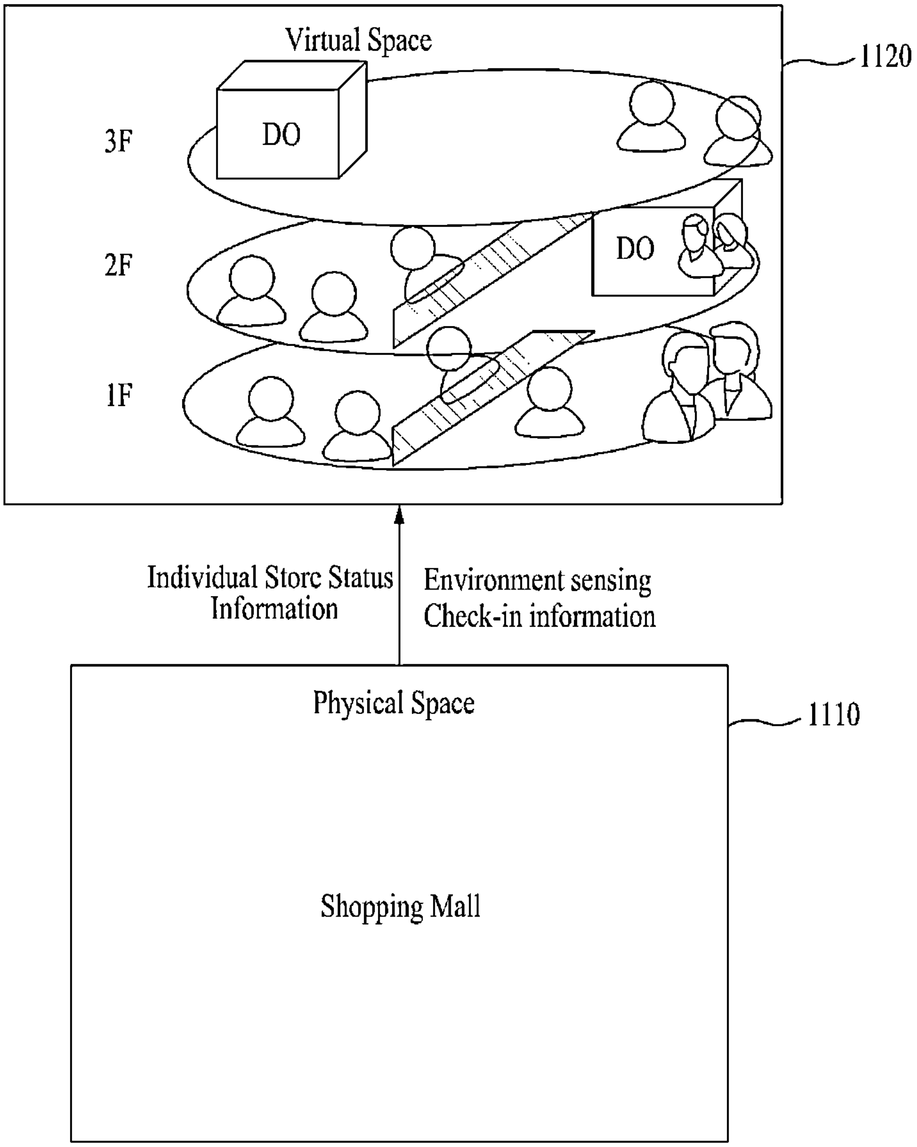

(3) Example 3: When Proceeding with Dating in the VS, a Method for Certificating the Corresponding Agent's Identity is Required FIG. 11 shows an example of a shopping mall providing a digital twin service simulating PS 1110 which is real world. Stores in the shopping mall in the PS 1110 may be represented as digital objects in VS 1120 based on status information of individual store. In the VS 1120, a virtual user generated based on the number of users entering and leaving the shopping mall may be included, and when it is possible to understand location such as a proximity sensor, user processing is possible based on location information. In the VS 1120, an agent that wants to express his or her information among users who checked in a specific store, or an agent generated as a virtual customer in the VS 1120 based on information checked in a specific store may be included, and at this time, the difference between the agents may be represented by classifying user features such as face, clothes, condition, and the like in image so that they may be visually distinguished. When a user who checked in a specific store allows his or her agent to be exposed in the VS 1120, the corresponding agent may have explicit surface including user information unlike a ghost agent.

Figure 12:
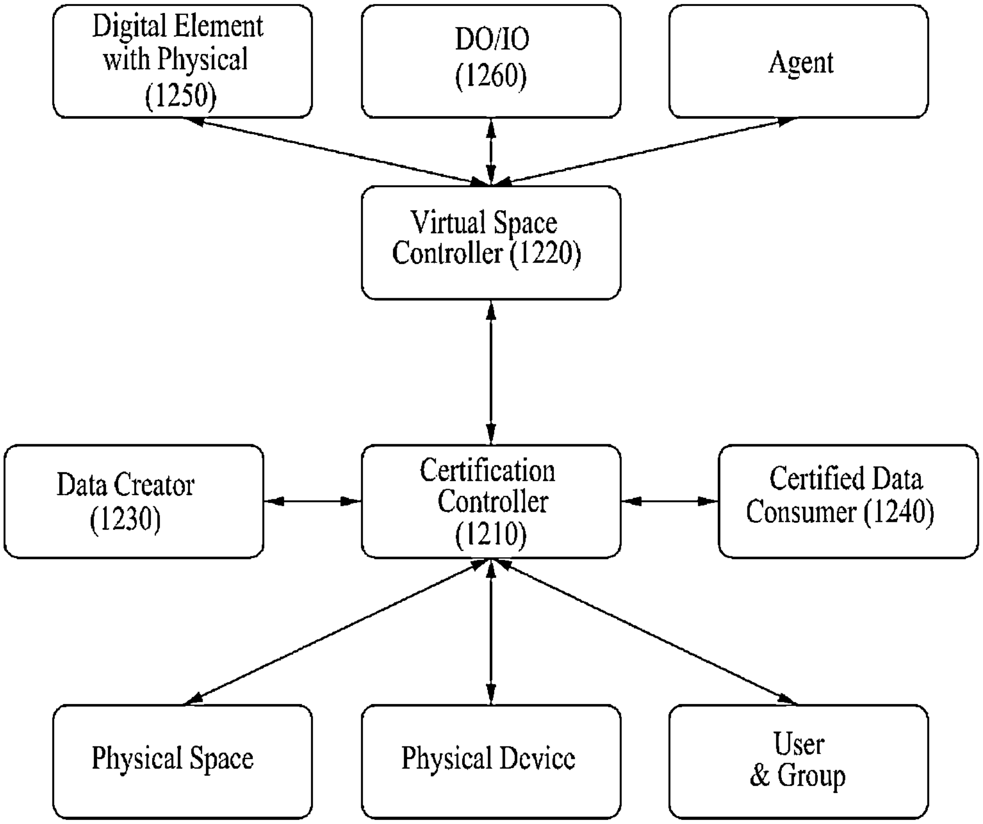
FIG. 12 illustrates an example of a service target based on a connection function between PS (Physical Space) and VS (Virtual Space) according to one example embodiment.

FIG. 12 illustrates an example of a service target based on a connection function between PS and VS. In this embodiment, a method for mutual connecting and certificating between the PS and the VS is required. Providing a system for organizing information capable of interworking in each area and interworking it is required. At this time, information for mutual connecting between the PS and the VS may be exposed or controlled according to the situation, and the corresponding information may be supplied to the desired source of demand.

Referring to FIG. 12, a Certification Controller 1210 provides a key function for managing mutual connection in connecting the VS and PS. Basically, the Certification Controller 1210 provides a registration process for connecting information in the VS and the PS, and provides certification for whether the space exists in real world. The information for mutual connection between the PS and the VS may be controlled by a VSC 1220 (corresponding to one of 812, 821, 831), and may be connected with a reliable real world data collecting system such as a Data Creator 1230 and share data with a Certified Data Consumer 1240 as an organization using it.

In a Digital Element with Physical 1250, other information (e.g. check in information of shopping mall or proximity sensor information, traffic jam, and the like) connected with space information such as information related to environment (e.g. air, wind, temperature, and the like) in VS environment is included. The Digital Element with Physical 1250 is a generic term for other entities, not entities with a separate owner such as a Digital Object 1260 (DO, IO, and the like), and may include information connected with the PS.

The Data Creator 1230 may include information which may be reflected in the VS as external API creating actual user information, and for example, a certificated fitness application and the like may correspond to this.

FIG. 13 shows examples of VS. In VS 1310, each space has a spatial specificity similar to that of actual PS when providing a service based on digital twin.

A Public Space 1311 which is one of the VS 1310 means a space made public for an agent of the VS 1310 such as a square, a park, and the like, and a separate agent permission is not required to enter the Public Space 1311, and real world devices connected to the Public Space 1311 are controlled by a VSC (corresponding to one of 812, 821, and 831).

A Commercial Space 1312 which is another of the VS 1310 means a digital object paid by a specific business operator such as a store, and generally means a space simulating an offline store in real world. The Commercial Space 1312 basically allows an anonymous agent to enter, but according to characteristics of the corresponding space owner, only registered agent may access to space of some digital object. The device connected with the Commercial Space 1312 may be interworked through the VSC (corresponding to one of 812, 821, and 831), and the space owner may be authorized control rights for the Commercial Space 1312 from the VSC.

A Home(Personal) Space 1313 which is another of the VS 1310 means private space as digital object configured by an individual. For the Home(Personal) Space 1313, basically only owner of the corresponding space may be access, and registered agent may be access according to request of the corresponding space owner. The device connected with the Home(Personal) Space 1313 may be interworked through the VSC (corresponding to one of 812, 821, and 831), and the space owner may be authorized control rights for the Home(Personal) Space 1313 from the VSC.

In case of the agent using the above described VS 1310 and digital twin service, VS information owned by the agent and information of the interworking device in the VS may be exposed based on certification. The VSC (corresponding to one of 812, 821, and 831) may use the VS information and device information in unidentified or anonymized form.

When the agent visits a specific store corresponding to the Commercial Space 1312 in the VS 1310 by using the VS information and the device information, the corresponding store may recommend customized products based on the user information in the VS 1310. For example, if there is a coffee machine in the Commercial Space 1312, it may recommend the user's favorite coffee beans, and if there is an audiobook, it may recommend an audiobook of a similar genre that the user prefers.

A certified space means a space that simulates a space existing in real world (e.g. store, brand, and the like) in the VS 1310 and provides a function mutual connected with real world.

Requirements of the certified space may include (1) user check-in, (2) connection with POS (point of sales) for membership, purchase, loyalty, and the like, (3) connecting with a device certified as a device providing a specific service, and the like. When using a certified device such as store BGM, fitness GYM, and the like in the certified space, additional rewards may be provided.

Figure 14:
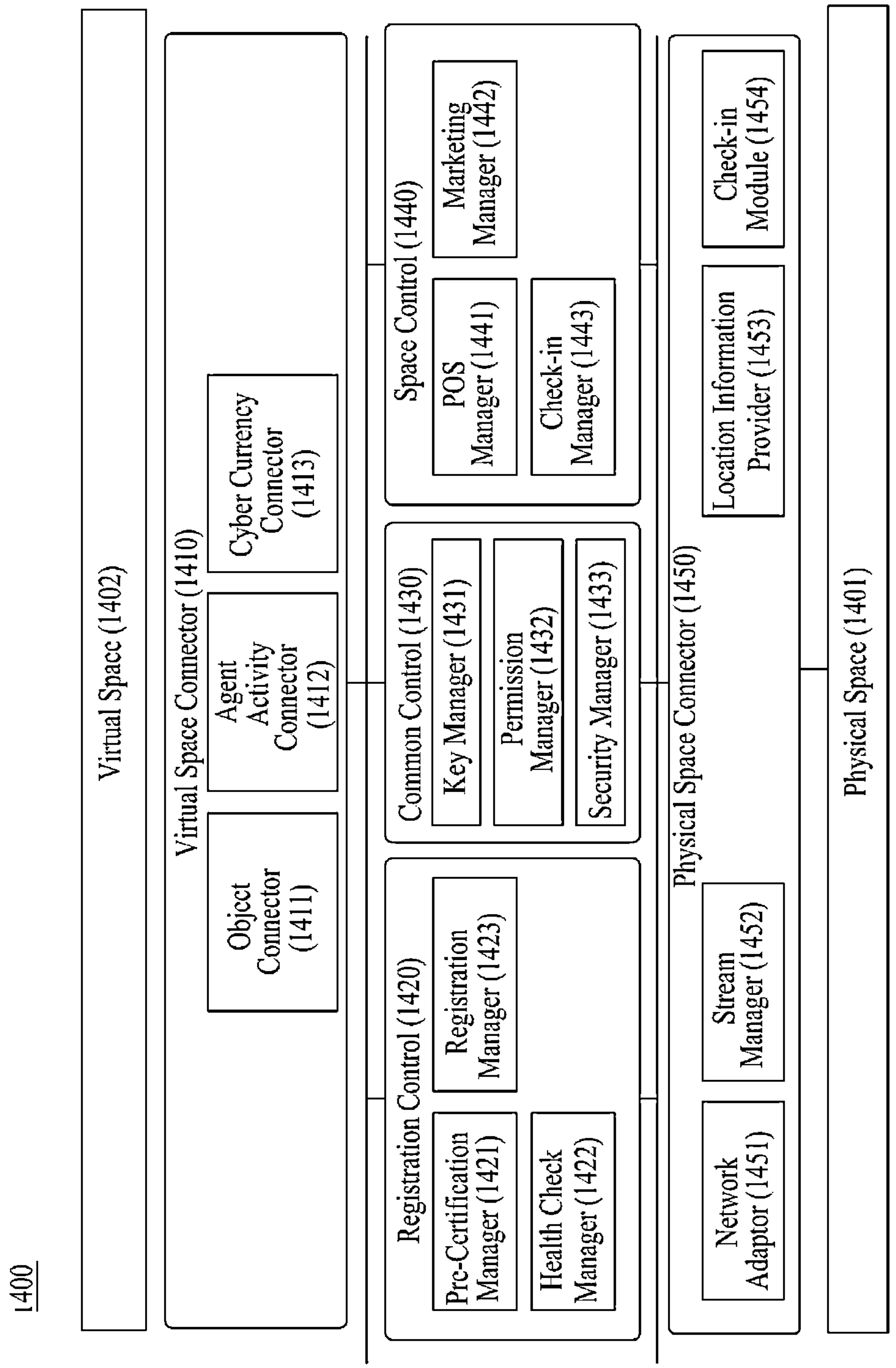
FIG. 14 is a block diagram illustrating an example of a certification and synchronization system for connection between PS (Physical Space) and VS (Virtual Space) according to one example embodiment.

FIG. 14 is a drawing illustrating an overview of a Certification and Synchronous System according to one example embodiment. A Certification and Synchronous System 1400 of FIG. 14 provides a process for certification and synchronization (interwork) for connection between PS 1401 and VS 1402.

The Certification and Synchronous System 1400 may be implemented through the computer device 200 described through FIG. 2. According to example embodiments, the Certification and Synchronous System 1400 may be implemented in the form of being included in the Virtual Space Management System 841 described through FIG. 8 or may be implemented in the form capable of interworking with the Virtual Space Management System 841 as a separate system.

The Certification and Synchronous System 1400 may include the service target (the Certification Controller 1210, the VSC 1220, the Data Creator 1230, and the like) described through FIG. 12.

Referring to FIG. 14, the Certification and Synchronous System 1400 may include a Virtual Space Connector 1410, a Registration Control 1420, a Common Control 1430, a Space Control 1440, and a Physical Space Connector 1450.

First, the Virtual Space Connector 1410 plays a role providing a connection function between services provided in the Certification and Synchronous System 1400, and may include an Object Connector 1411, Agent Activity Connector 1412, and a Cyber Currency Connector 1413.

The Object Connector 1411 may connect event information related to digital objects (DO, IO, and the like) on VS. For example, the Object Connector 1411 may provide information of on/offline advertisement connection and event, and the like, and at this time, video stream in real environment may be used.

The Agent Activity Connector 1412 may connect information related to the agent on VS. A service in the form of virtually exposing the agent information of the user who checked in offline is possible online. For example, the Agent Activity Connector 1412 may expose the corresponding motion on virtual agent of VS when the user actual exercises in real world fitness GYM and the like, and visual effect according to the amount of exercise may be reflected to the agent in VS.

The Cyber Currency Connector 1413 may connect information related to currency in VS. For example, the Cyber Currency Connector 1413 may interwork data received from a store POS and interwork point and the like in VS.

In addition, the Registration Control 1420 may include a Pre-Certification Manager 1421, a Health Check Manager 1422, and a Registration Manager 1423.

The Pre-Certification Manager 1421 may issue a code (e.g. OTP and the like) that may be preregistered at the time of device production or at the time of production when an API function in software is built-in. The Pre-Certification Manager 1421 may proceed with registration in the form of pre-certification when a digital twin device production company or a software company mass produces certified devices providing a connection service with VS.

For example, a check-in device, a POS device, a Waiting Queue Module, and the like correspond to it, and hardware or software is unrelated.

The Health Check Manager 1422 may take charge of status check of the registered device. The Health Check Manager 1422 may periodically receive data from the device or may operate status check in a method for collecting information by request from VS.

The Registration Manager 1423 may provide a function for individual registration of device and software. In case of the device, the Registration Manager 1423 may register by using device information (e.g., UUID, unique IME, MAC address, and the like) or using a registration code based on OTP issued by using the Pre-Certification Manager 1421. In case of software, the Registration Manager 1423 may certify by using a unique key value, and may provide a separate certification module on VS. In case of the space, the Registration Manager 1423 may use map based data (e.g. identifiable information such as land registration data, road view data, satellite photograph, and the like) or a separate certification method (e.g., franchise information, land register, and the like). At this time, the Registration Manager 1423 may proceed with space registration by interworking space information provided by a third party business operator. In case of a group, the Registration Manager 1423 may have information of agent registered with a specific number of people or more, and may give when paying costs for owning the corresponding group name on VS. The certified group means a group to use the same environment (rights) with real world in the VS 1402 through certification in the VS 1402 among a specific interest group and a real world group, and for example, social service page form may be spread to the group. It may set conditions to form a group based on certificated information in real world or the VS 1420, not based on naming and the like, and at this time, the conditions may apply a rule that there are N or more certification agents in the VS 1402.

Or, when paying a certain cost required by the VS 1402, a group name in the corresponding VS 1402 may be uniquely given like a domain. Through this, the Registration Manager 1423 may differentiate from an agent that does not meet the corresponding conditions by forming a group meeting the conditions as certificated information in the VS 1402.

In addition, the Common Control 1430 may include a Key Manager 1431, a Permission Manager 1432, and a Security Manager 1433.

The Key Manager 1431 may provide a function for issuing and managing a key used for a service throughout the service.

The Permission Manager 1433 may provide a function for managing permission by each individual service subject (e.g. agent, device, space owner of digital objects, group owner).

The Security Manager 1433 may provide a security function for each module according to interworking between the PS 1401 and the VS 1402.

Also, the Space Control 1440 provides a function for managing information of the PS 1401 bound to the VS 1402, and may include a POS Manger 1441, a Marketing Manager 1442, and a Check-in Manager 1443.

The POS manager 1441 plays role managing POS sales information. The POS Manger 1441 may manage rewards information such as points, coupons, and the like in addition to sales information.

The Marketing Manager 1442 may be used when proceeding with the interworked event between the PS 1401 and the VS 1402, and for example, it may update online information when checking in offline.

The Check-in Manager 1443 may provide a management function for user entering and visiting history connected with space (PS 1401 and VS 1402).

Last, the Physical Space Connector 1450 provides a function for connecting information in the PS 1401 which is real world. The connection object may include a device type as well as a software type. The Physical Space Connector 1450 may include a Network Adaptor 1451, a Stream Manager 1452, a Location Information Provide 1453, and a Check-in Module 1454.

The Network Adaptor 1451 may connect a network service for traffic transmitted from the PS 1401. The Network Adapter 1451 may support various network protocols (e.g., TCP, HTTP, and the like) for compatibility for each device or each service.

The Stream Manager 1452 plays a role processing data consistently received from a device or the PS 1401. The Stream Manger 1452 may provide a function for receiving large scale stream and buffering or queuing it, and then, may provide a function for routing the received stream.

The Location Information Provider 1453 may manage connection information with service business operator supplying local information. The Location Information Provider 1453 may mange main information such as real estate or downtown information for space management. Business operators providing space owner information may correspond to the management object.

The Check-in Module 1454 may manage user entering and visiting history connected with the space through interworking with the Check-in Manager 1443.

Figure 15:
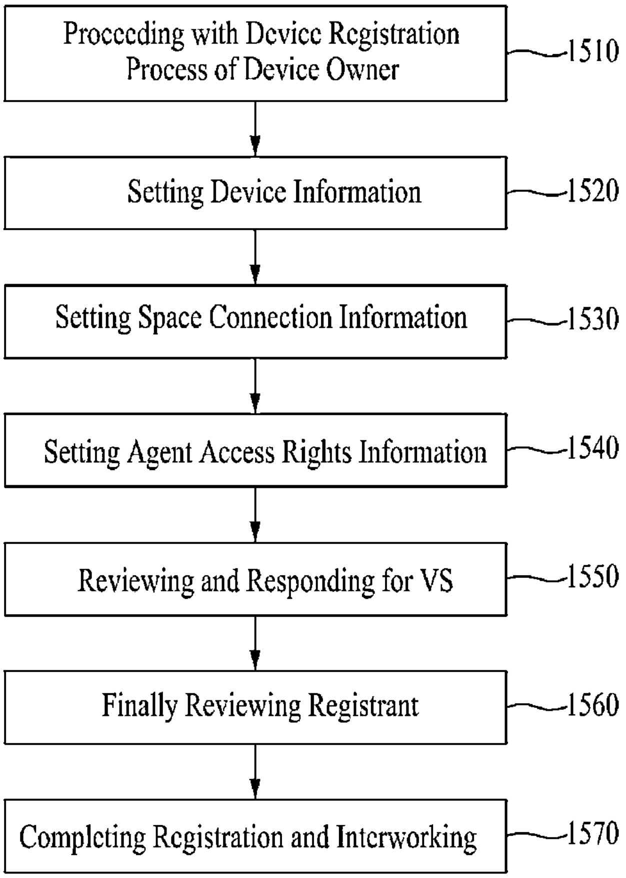
FIG. 15 is a flowchart illustrating an example of a device certification process according to one example embodiment.

FIG. 15 is a flowchart illustrating an example of a device certification process according to one example embodiment. A device certification process according to example embodiments may be performed by the computer device 200 implementing the Certification and Synchronous System 1400.

In Step 1510, the Certification and Synchronous System 1400 may enter a device registration process in accordance with the device owner's request and proceed with the corresponding process.

In Step 1520, the Certification and Synchronous System 1400 may set device information to be registered as an individual registration function for a device. At this time, the device information may include basic information for recognizing the corresponding device in the VS. When providing a service by connected in the VS, permission related to data access between the owner and the VS should be mutually set, and the VS service provider should notify to an agent using the corresponding device. The Certification and Synchronous System 1400 may set device name, device ID (serial number or unique key), device data interface (e.g., API and the like), tracking permission information, device UI (e.g. 3D rendering information) and the like as the device information. In case of the device ID, when a device producer provides a unique registration function to the VS service business operator, it needs to be registered in advance. For the tracking permission information, among the data acquired by the VS, the device owner and the agent may provide whether the data is opened or not in the permission form.

In Step 1530, the Certification and Synchronous System 1400 may set space connection information for the device registered in Step 1520. The space connection information may be registered by the owner of the digital object through a contact with the VS service provider or individually registered by individual users. The owner of the digital object may provide a service based on connection between spaces in the VS or connection with several offline branches. At this time, the VS service provider may additionally request costs for registration, and may set limitation for registration. The Certification and Synchronous System 1400 may set the number of connectable devices per space, the number of connectable agents per device, the number of devices that may be updated simultaneously, the number of device that may be exposed simultaneously, the number of devices that may be controlled simultaneously, and the like as the space connection information.

In Step 1540, the Certification and Synchronous System 1400 may set agent access rights information for the device registered in Step 1520. The Certification and Synchronous System 1400 may authorize each agent that may interwork with the device connected with the VS with access rights for the corresponding device.

In Step 1550, the Certification and Synchronous System 1400 may review and verify a response for the VS in which the device information and the space connection information are set. The Certification and Synchronous System 1400 may check status of the device by a method for periodically receiving data from the registered device or collecting information by request from the VS.

In Step 1560, the Certification and Synchronous System 1400 may confirm the final review for the corresponding device from the register who is the device owner.

In Step 1570, the Certification and Synchronous System 1400 may provide a service based on digital twin through connection between the device in the VS and the agent if the device registration is completed.

Figure 16:
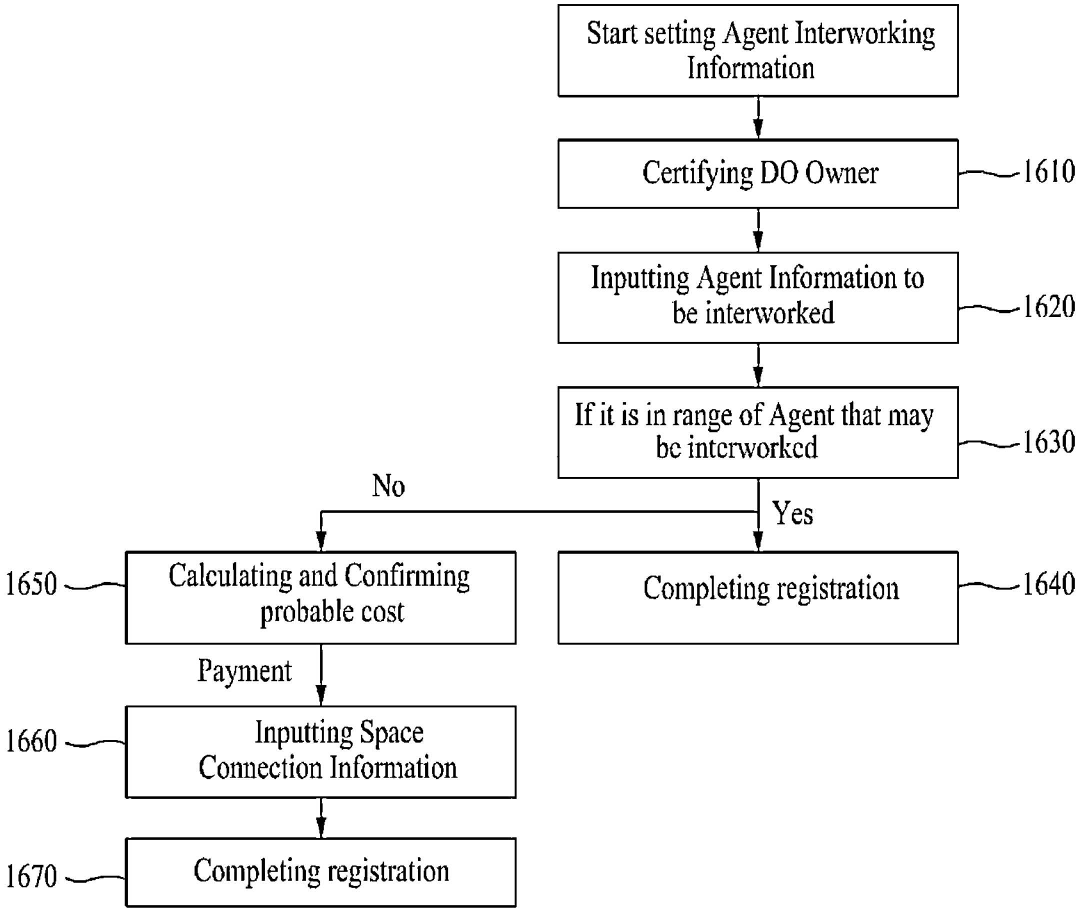
FIG. 16 is a flowchart illustrating an example of an agent registration process according to one example embodiment.

FIG. 16 is a flowchart illustrating an example of an agent registration process according to one example embodiment. The agent registration process according to example embodiments may be performed by the computer device 200 implementing the Certification and Synchronous System 1400.

In Step 1610, the Certification and Synchronous System 1400 may certify an owner of digital object. The Certification and Synchronous System 1400 may perform certification for the owner of t digital object providing a service based on connection between spaces in the VS or connection with several branches.

In Step 1620, the Certification and Synchronous System 1400 may input agent information to be interworked with the digital object.

In Step 1630, in case of registering an agent corresponding to the input agent information, the Certification and Synchronous System 1400 may determine whether it is out of range of the agent that may be interworked with the digital object.

In Step 1640, when it is not out of the corresponding range within the range of the agent that may be interworked with the digital object, the Certification and Synchronous System 1400 may complete the corresponding agent registration according to the input agent information.

In Step 1650, when it is out of range of the agent that may be interworked with the digital object, the Certification and Synchronous System 1400 may request additional cost by calculating a probable cost for the digital object, and may confirm payment for the corresponding cost.

In Step 1660, the Certification and Synchronous System 1400 may update the range of the agent that may be interworked with the digital object by inputting the space connection information according to the payment of the cost.

In Step 1670, the Certification and Synchronous System 1400 may complete the corresponding agent registration as the range of the agent that may be interworked with the digital object is updated.

The Certification and Synchronous System 1400 may set additional agent interworking information to the previously registered digital object.

A device register may set access rights of the agent for the corresponding device. For example, in case of a product seller, registration rights for a corresponding product is acquired through the Certification Controller 1210, and based on this, the maximum number of the agents that may be registered may be determined. For example, maximum two agents may be registered for one device code.

After this, in the situation that an actual purchase is made, a user may proceed with a process for certification of registration code of an actual product and use agent. After initial certification, the owner of the corresponding digital object may register an additional user agent within the determined range of agent registration available. At this time, the rights of the owner of the digital object may be authorized.

Separately, when an owner of the Commercial Space 1312 or the Home(Personal) Space 1313 tries to provide a device existing in his or her PS to several agents, separate rights are obtained from the Certification Controller 1210.

Figure 17:
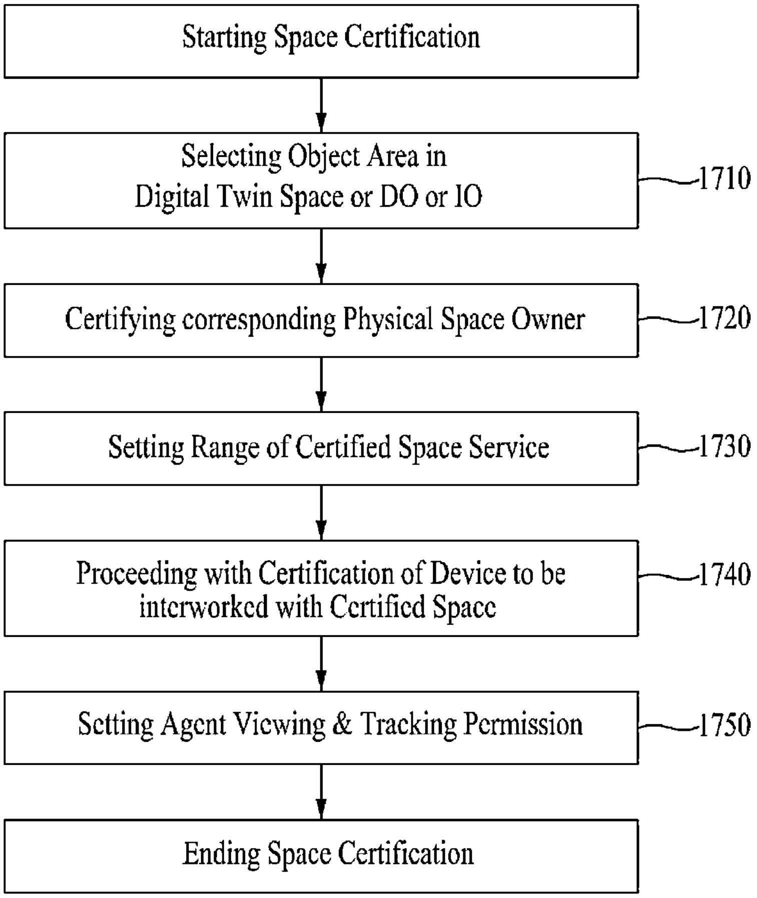
FIG. 17 is a flowchart illustrating an example of a space certification process according to one example embodiment.

FIG. 17 is a flowchart illustrating an example of a space certification process according to one example embodiment. The space certification process according to example embodiments may be performed by the computer device 200 implementing the Certification and Synchronous System 1400.

The Certification and Synchronous System 1400 may register space for providing a service based on digital twin in DTS.

In Step 1710, the Certification and Synchronous System 1400 may select OA (object Area) or digital object (DO, IO, and the like) in DTS for space registration. In order for a real world owner to search the OA or digital object in DTS, an interface that may be searched by inputting address, phone number, and the like (when information in the VS is connected with map data) or an interface that may be selected in the form of directly pin it by using a map and the like.

In Step 1720, the Certification and Synchronous System 1400 may perform owner certification of PS corresponding to the OA or the digital object selected in Step 1710. For owner certification of an actual space, a VS manager may use mutual information in a map and the like to use map-based data. When a specific owner such as a franchise and the like tries to register mapping information, an interface that may directly input relevant information by using OCR and the like may be provided.

In Step 1730, the Certification and Synchronous System 1400 may set a service range of space certified through the above described process 1710, 1720, i.e., a range of an actual space. For example, the Certification and Synchronous System 1400 may set a service range by using land registration range of map data. As another example, the Certification and Synchronous System 1400 may also set a service range through a selection method by using actual modeling information. After synthesizing images for space by using a scanning by using a drone and the like or a depth sensor and the like, rights demand for the corresponding space may be applied. As another example, the Certification and Synchronous System 1400 may apply differentiated demand according to the space set range based on differentiated grade according to registration cost, advertisement exposure space, and the like.

In Step 1740, the Certification and Synchronous System 1400 may proceed with certification of a device to be interworked with the certified space. When the Certification and Synchronous System 1400 tries to register a device in the interworking space, additional registration for the device may be proceeded.

In Step 1750, the Certification and Synchronous System 1400 may set agent viewing and tracking permission for the certified space. The Certification and Synchronous System 1400 may set agent information and the like to acquire in the interworking space as information between the interworking space and the agent, and also may request agent tracking information within the interworking space according to the cost.

Figure 18:
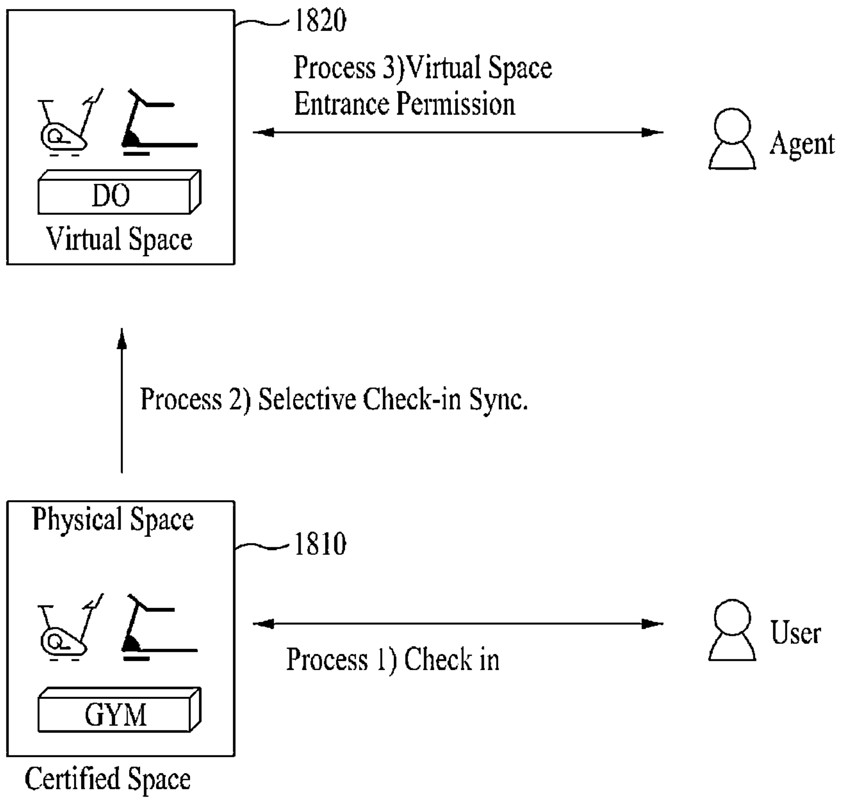
FIG. 18 illustrates an example of a user check-in process in certificated space according to one example embodiment.

FIG. 18 illustrates an example of a user check-in process in certificated space according to one example embodiment. The user check-in process according to example embodiments may be performed by the computer device 200 implementing the Certification and Synchronous System 1400.

Process 1) is that after arriving in PS 1810 corresponding to a certified space, a user proceeds with check-in by using his or her mobile device. As a check-in method, a method for processing check-in by using a signal which may be acquired from the mobile device, e.g., GPS, WiFi, beacon, and the like, a method for processing check-in by using QR code, a method for processing check-in based on AR based space recognition technology, and the like may be used.

Process 2) is that the user may selectively determine whether to synchronize check-in between the certified space and VS 1820 for interworking with an agent in the VS 1820.

Process 3) is that agent entry in the VS 1820 may be permitted. When the agent connects to a specific space range in the VS 1820, the agent may enter the VS 1820 of the corresponding space after user certification/noncertification.

The Certification and Synchronous System 1400 may generate and provide onetime check-in code for check-in of the user. The user may connect to the certified space through the onetime check-in code by using the mobile device when checking-in. The check-in information of the user for the certified space is recorded in the VS 1820, and when using the device registered in the certified space, the use information may be also recorded.

A differentiated service may be provided according to a check-in method based on macro such as GPS and a check-in method such as WiFi or beacon and the like on offline according to owner selection of digital object in the VS 1820.

Figure 19:
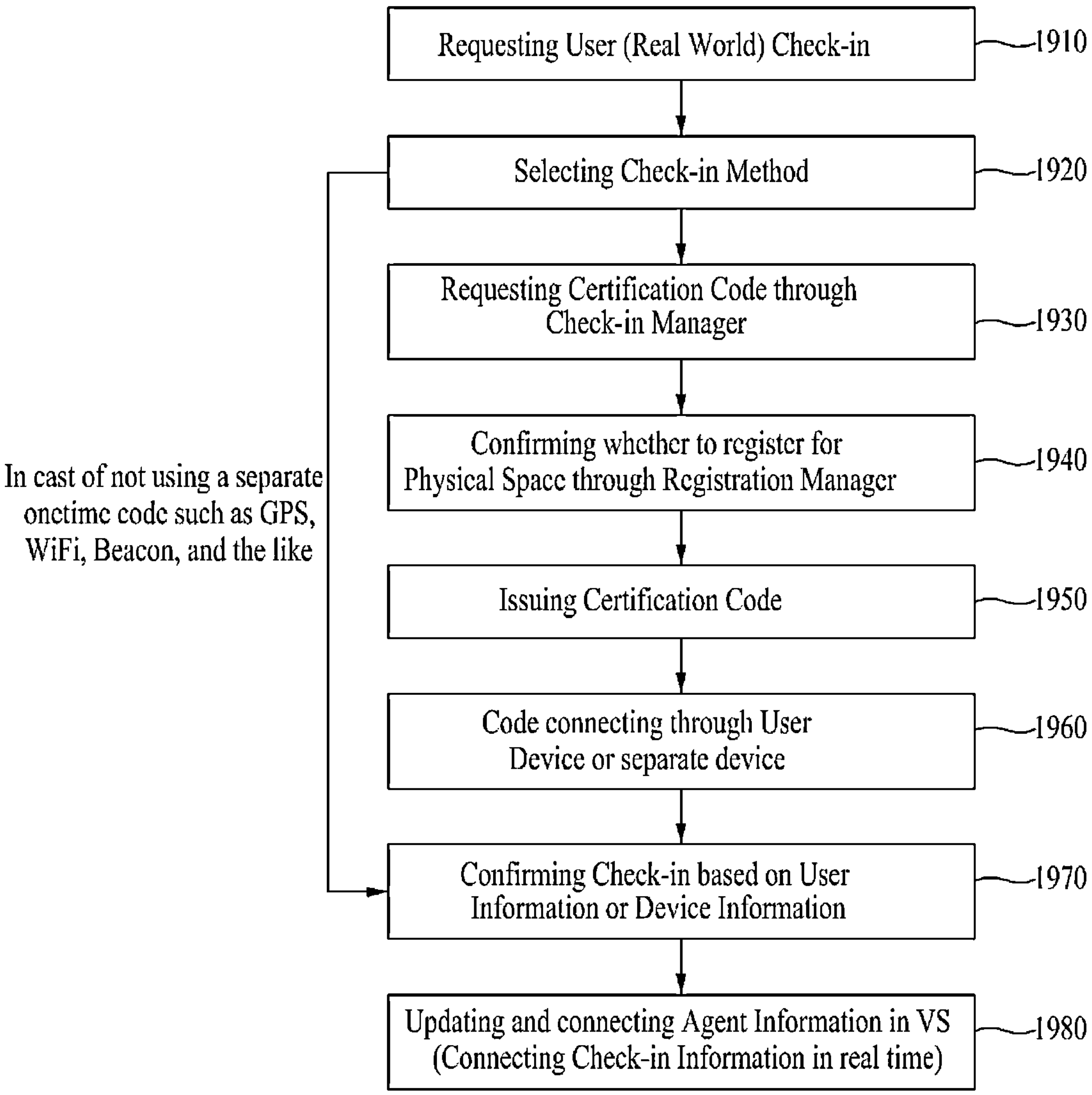
FIG. 19 is a flowchart illustrating an example of a user check-in process in certificated space according to one example embodiment.

FIG. 19 is a flowchart illustrating an example of a user check-in process in certificated space according to one example embodiment. The user check-in process may be performed by the computer device 200 implementing the Certification and Synchronous System 1400.

In Step 1910, the Certification and Synchronous System 1400 may receive user check-in request in PS from a user device.

In Step 1920, the Certification and Synchronous System 1400 may receive selection for a check-in method from a user for the user check-in request. The user check-in method may include a check-in method using onetime code such as QR code, barcode, pin number, and the like, a check-in method using location based certification such as GPS, WiFi, beacon, and the like, a check-in method through AR based space or surface (e.g. object or sculpture and the like for certifying a specific store) recognition, as described above.

In Step 1930, when the check-in method using a separate onetime code is selected in Step 1920, the Certification and Synchronous System 1400 may request a certification code through the Check-in Manager 1443. At this time, the certification code request should be provided with PS information, and the corresponding information may composed of location base, registered SSID (Service Set Identifier) base, beacon ID base, QR code or barcode base or a separate pin number, and the like, and AR based surface detection point information of certification recognition object and the like may be included.

In Step 1940, the Certification and Synchronous System 1400 may confirm whether to register for PS that requested user check-in through the Registration Manager 1423 based on PS information included in the certification code request. The Certification and Synchronous System 1400 may confirm whether to register for the PS that the user tries to check in by using map based data (e.g. identifiable information such as land registration data, road view data, satellite photograph, and the like) or a separate certification method (e.g. franchise information, land register, and the like).

In Step 1950, when the PS that requested the user check-in corresponds to the space registered in advance, the Certification and Synchronous System 1400 may issue a certification code for user check-in.

In Step 1960, the Certification and Synchronous System 1400 may recognize code connection through the user device or a separate device, i.e., connection of the certification code issued in Step 1950.

In Step 1970, the Certification and Synchronous System 1400 may confirm user check-in based on the user information according to code connection or device information.

When the check-in method selected in Step 1920 does not use a separate onetime code, the code generation process is skipped, and the user check-in may be proceeded by directly entering Step 1970.

In Step 1980, the Certification and Synchronous System 1400 may update agent information in the VS according to the user check-in and may interwork check-in information in real time. The check-in information may be exposed or not exposed to different digital object or agent according to user setting. For example, even if check-in is performed in real world, the corresponding check-in information is not updated to the user agent of the VS based on the setting value for the agent in the VS.

Figure 20:
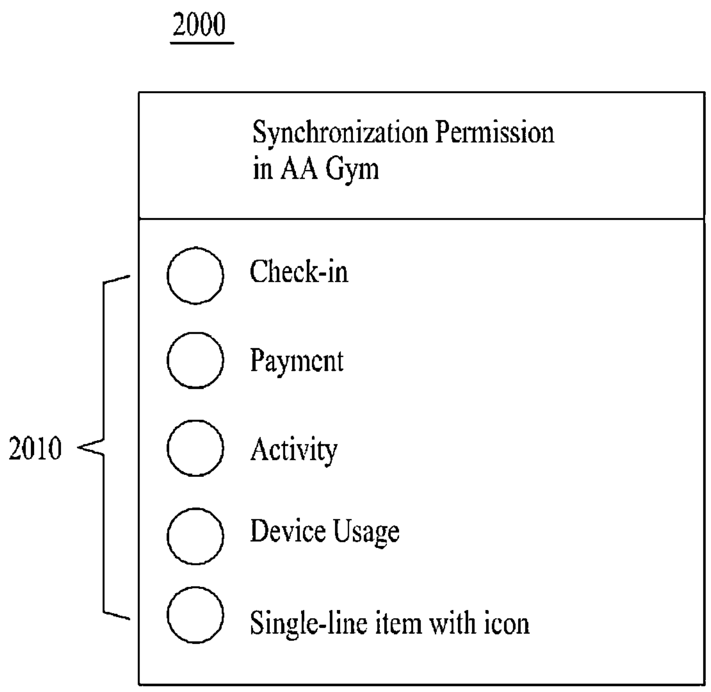
FIG. 20 illustrates an example of an interface screen for permitting synchronization when connecting between PS and VS according to one example embodiment.

The Certification and Synchronous System 1400 may provide a permission control function of the agent when connecting the PS and the VS. When connecting user information and activity information in the PS and the VS, whether to synchronize the corresponding information, whether to expose (reflect) and the like may be determined according to selection of the user. Referring to FIG. 20, the Certification and Synchronous System 1400 may provide a synchronization object list 2010 for synchronization permission through a synchronization permission screen 2000. A user may selectively set a synchronization object such as check-in, payment, activity, display use, and the like through the synchronization object list 2010, and permit synchronization between the PS and the VS for the selected object. When connecting a registered offline store and online store, an owner of a digital object may control setting related to synchronization between the corresponding spaces. Control point for synchronization is available in the synchronization permission screen 2000 provided in a mobile device of the user and a control panel in the VS.

Likewise, According to the example embodiments, mutual connection relation between virtual world and physical world may be certified and synchronized, and space certification and device certification may be performed for mutual connection between virtual world and physical world, and according to example embodiments, user check-in in a certified space may be performed.

The units described herein may be implemented using hardware components, software components, and/or a combination thereof. For example, a processing device may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Also, examples of other media include app store distributing applications or recording media and storing media managed in sites, servers, and the like distributing other many software.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method performed by a computer apparatus comprising at least one processor, the method comprising:

providing, by the at least one processor, a digital twin service by mutually connecting a virtual space and a physical space based on information of the virtual space and the physical space, the providing including managing interconnection between the virtual space and the physical space based on the information of the virtual space and the information of the physical space, the managing including:

registering a device existing in the physical space as a digital object in the virtual space, performing user check-in including checking a user in to the digital twin service based on user information or device information in the physical space linked with the virtual space; and imitating an interaction between the user and the device in the physical space as an interaction between an agent corresponding to the user and the digital object in the virtual space.

2. The method of claim 1, wherein the performing comprises:

issuing a certification code in response to a user check-in request in the physical space; and processing the user check-in using user information or device information according to connection using the certification code.

3. The method of claim 1, wherein the performing comprises:

determining whether the physical space requesting the user check-in is a space registered in a digital twin space that provides the digital twin service.

4. The method of claim 3, wherein the determining comprises:

confirming whether the physical space for the check-in request is registered based on map-based data.

5. The method of claim 3, wherein the performing further comprises:

issuing a certification code when the physical space is determined to be the space registered in the digital twin space; and processing the user check-in using user information or device information according to connection using with the certification code.

6. The method of claim 1, wherein the performing comprises:

performing the user check-in through at least one of location-based check-in, one-time code-based check-in, and space or shape recognition-based check-in.

7. The method of claim 1, wherein the providing further comprises:

updating agent information in the virtual space in response to the user check-in in the physical space.

8. The method of claim 1, wherein the providing further comprises:

interworking check-in information according to the user check-in in the physical space with the virtual space in real-time.

9. The method of claim 1, wherein the providing further comprises:

determining whether to synchronize check-in between the virtual space and the physical space based on user selection.

10. A computer apparatus comprising at least one processor configured to execute computer-readable instructions, wherein the at least one processor is configured to provide a digital twin service by mutually connecting a virtual space and a physical space based on information of the virtual space and the physical space, the providing including managing interconnection between the virtual space and the physical space based on the information of the virtual space and the information of the physical space, the managing including:

registering a device existing in the physical space as a digital object in the virtual space;

performing user check-in including checking a user in to the digital twin service based on user information or device information in the physical space linked with the virtual space; and imitate an interaction between the user and the device in the physical space as an interaction between an agent corresponding to the user and the digital object in the virtual space.

11. The computer apparatus of claim 10, wherein the at least one processor:

issues a certification code in response to a user check-in request in the physical space; and processes the user check-in using user information or device information according to connection using with the certification code.

12. The computer apparatus of claim 10, wherein the at least one processor is configured to determine whether the physical space requesting the user check-in is a space registered in a digital twin space that provides the digital twin service.

13. The computer apparatus of claim 10, wherein the at least one processor is configured to perform the user check-in through at least one of location-based check-in, one-time code-based check-in, and space or shape recognition-based check-in.

14. The computer apparatus of claim 10, wherein the at least one processor is configured to update agent information in the virtual space in response to the user check-in in the physical space.

15. The computer apparatus of claim 10, wherein the at least one processor is configured to interwork check-in information according to the user check-in in the physical space with the virtual space in real-time.

16. The computer apparatus of claim 10, wherein the at least one processor:

determines whether to synchronize check-in between the virtual space and the physical space based on user selection.

* * * * *